(12) United States Patent
Walsh et al.

(10) Patent No.: US 10,989,071 B2
(45) Date of Patent: Apr. 27, 2021

(54) HIGH EFFICIENCY DUCTED HEAT EXCHANGER SYSTEMS

(71) Applicant: MEGGITT (UK) LIMITED, Christchurch (GB)

(72) Inventors: Philip Walsh, Solihull (GB); Silviu-Cristian Vaideanu, Winchester (GB); Christopher Simon Elliott, Redditch (GB); Benjamin Thomas Matthews, Birmingham (GB); Jeffrey Allen LeHew, Los Angeles, CA (US); Steven William James Henderson, Rugby (GB)

(73) Assignee: Meggitt (UK) Limited, Christchurch (GB)

( * ) Notice: Subject to any disclaimer, the term of this patent is extended or adjusted under 35 U.S.C. 154(b) by 72 days.

(21) Appl. No.: 16/054,997

(22) Filed: Aug. 3, 2018

(65) Prior Publication Data

US 2020/0040765 A1 Feb. 6, 2020

(51) Int. Cl.
| | | |
|---|---|---|
| *F01D 25/14* | (2006.01) | |
| *B64D 33/02* | (2006.01) | |
| *B64D 33/08* | (2006.01) | |
| *F02C 7/14* | (2006.01) | |

(52) U.S. Cl.
CPC ............ *F01D 25/14* (2013.01); *B64D 33/02* (2013.01); *B64D 33/08* (2013.01); *F02C 7/14* (2013.01); *B64D 2033/024* (2013.01); *F05D 2250/38* (2013.01); *F05D 2260/213* (2013.01)

(58) Field of Classification Search
CPC ......... F01D 25/14; B64D 33/02; B64D 33/08; B64D 2033/024; F02C 7/14; F02D 2250/38; F05D 2260/213
USPC ........................................................ 165/51
See application file for complete search history.

(56) References Cited

U.S. PATENT DOCUMENTS

| | | | | |
|---|---|---|---|---|
| 2002/0158165 A1* | 10/2002 | Demay | .................. | B64D 33/02 |
| | | | | 244/53 B |
| 2003/0163985 A1* | 9/2003 | Stretton | .................. | F02K 1/805 |
| | | | | 60/226.1 |
| 2005/0263643 A1* | 12/2005 | Stretton | ................ | F01D 11/005 |
| | | | | 244/53 R |
| 2007/0295492 A1 | 12/2007 | Sharp et al. | | |
| 2015/0052907 A1* | 2/2015 | Murphy | ................ | F01D 17/148 |
| | | | | 60/783 |
| 2016/0108814 A1* | 4/2016 | Schmitz | .................... | F02C 7/10 |
| | | | | 60/39.511 |
| 2016/0123230 A1* | 5/2016 | Thomas | ................ | F28D 1/0358 |
| | | | | 60/772 |

* cited by examiner

*Primary Examiner* — Joel M Attey
(74) *Attorney, Agent, or Firm* — Hackler Daghighian Martino & Novak

(57) ABSTRACT

A heat exchanger assembly that in a preferred embodiment comprises: an inlet duct lower wall interfacing with a bypass duct; an outlet duct lower wall interfacing with a bypass duct; a heat exchanger coupled between the inlet duct lower wall and the outlet duct lower wall wherein the heat exchanger is at a compound angle with respect to an inlet duct air flow direction; and a fairing coupled to the top of the heat exchanger wherein the fairing forms the inlet duct upper wall and the outlet duct upper wall.

33 Claims, 19 Drawing Sheets

HIGH EFFICIENCY DUCTED HEAT EXCHANGER SYSTEMS

FIELD

The present patent document relates generally to ducted heat exchanger assemblies and methods of making the same. More specifically, the present patent document relates to compact, high efficiency ducted heat exchanger assemblies for turbo fan applications. Particular applications may include for aerospace and specifically for aircraft.

BACKGROUND

The requirements posed by aircraft engines are changing over time, and engines have evolved dramatically in the last fifty years. As may be seen in FIG. 1, present day engines like the Rolls-Royce Trent 1000 engine 10 dwarf the size of an older fuselage like that of the Concorde 11 and its Rolls-Royce/Snecma Olympus 593 engines 12.

Traditionally, nacelles housed a multitude of components including the accessory gearbox, air-oil heat exchangers and the Full Authority Digital Engine Control (FADEC). As engine fan diameters increase, the size of the nacelle would theoretically need to increase as well. However, the drag generated by the larger nacelle eventually becomes too large. Accordingly, thinner and thinner nacelle designs have become commonplace a.k.a. slim-line nacelles. Larger engines and fans and thinner nacelles reduce the volume left to house the components traditionally housed within the nacelle. As an alternative, these components have been housed within the core zone. As the core zone already houses ducting, pipework, bleed assemblies and other components, relocated hardware previously housed within the nacelle can prove to be a challenge due to envelope constraints.

The increase in fan diameter creates changes to other assembly level requirements including a requirement to reduce the fan speed relative to the turbine speed. A reduction of the fan rotational speed with respect to the turbine rotational speed may be accomplished with an additional gearbox. Currently, heat load from the accessory gearbox, bearings and generators is typically used to pre-heat the fuel with the excess heat being fed into the bypass duct air flow, or into air flow external to the nacelle. It is estimated that the additional gearbox to reduce the fan speed will grossly increase the heat load introduced into the oil. Because the current designs already produce more heat than can be absorbed by the fuel during preheating, the additional heat load from the extra gear box must be dissipated into the bypass duct air flow.

As engine manufacturers strive towards more fuel-efficient architectures, assemblies which are usually driven by compressor discharge pressure, such as Environmental Control Systems (ECS), are being powered by electric assemblies. These assemblies put extra demand on the electrical generators; again, this additional energy results in extra heat load being dissipated into the oil.

As may be appreciated, as engine sizes increase, heat loads are increasing while the volumes available for heat exchanger assemblies for cooling are decreasing. Accordingly, the ability to better manage the heat loads within the engine becomes of paramount importance. To this end, the Applicant describes herein a completely new design for a ducted heat exchanger system. The new design is built on top of some core principals, which allow it to be more compact and more efficient than previous designs.

Applicant is no stranger to the design of heat exchangers for aerospace applications. Amongst the Applicant's portfolio of heat exchangers are numerous designs of air-oil heat exchangers which are in use on commercial and military engine platforms. In two of Applicant's prior designs, the heat exchangers reside within the secondary air flow stream (bypass duct) and are mounted on the fan case. These assemblies are described as fully protruding, that is, all the major components are mounted within the bypass duct.

FIG. 2 illustrates a three-dimensional cross-section of one of Applicant's prior heat exchanger 14 designs. The heat exchanger design depicted in FIG. 2, does not feature any fairings or aerodynamic aids. Although fulfilling the customer requirements, this design not only greatly affects the flow within the bypass duct 13 in terms of total pressure loss ($\Delta P/P$), but also affects the thrust coefficient of the cold nozzle flow. Accordingly, the design shown in FIG. 2 negatively impacts both thrust and fuel consumption.

FIG. 3 illustrates an isometric three-dimensional view of one of Applicant's prior heat exchanger designs that includes shrouds. This design is similar to the design shown in FIG. 2 but utilizes a small shroud on the inlet 15 and outlet 15 of the heat exchanger 16. Whilst the addition of the shrouds improves the overall aerodynamic performance, the overall pressure loss is still high due to the relatively large blockage plus the high approach velocity at the heat exchange matrix.

FIG. 4 illustrates a diagram of a third previous design by Applicant, which takes a different approach to mounting the heat exchanger. As may be seen in FIG. 4, an inlet duct 24 takes secondary air into an Applicant produced heat exchanger 20 mounted on the perimeter of the engine core casing 22 and then returns the heated air back into the bypass duct via a return duct 26. The diagram of FIG. 4 highlights the relative size of the assembly to the engine core casing 22. As may be appreciated, the assembly of FIG. 4 takes up a lot of additional space outside the engine core casing 22.

In the design shown in FIG. 4, the inlet duct features a diffuser which slows the air speed before the air is ingested by the heat exchanger 20. The diffuser has a negative impact on heat exchange performance but a positive impact on pressure loss across the heat exchanger matrix. Because pressure loss is a function of velocity squared, the overall impact of the diffuser is positive. Using a diffuser in this manner is a compromise because it is long and offers many packaging constraints and the resultant diffuser design may stall under certain flow conditions effectively constricting the performance of the assembly.

As may be appreciated, it would be desirable to have a new heat exchanger design that has a reduced footprint in the overall volume of the assembly while having increased performance/efficiency to deal with the increasing heat load demands of modern engines.

SUMMARY OF THE EMBODIMENTS

Objects of the present patent document are to provide an improved heat exchanger assembly. In particular, the heat exchanger assemblies disclosed and taught herein may be used with gas turbine engines and particularly with aircraft engines covering air cooled fluid heat exchangers. In various places throughout this patent document, reference is made to "fluids" that are being cooled, "fluids" could refer to lubricating oils, air or other such fluids.

To these ends, a heat exchanger assembly is provided. In preferred embodiments, the heat exchanger assembly comprises: an inlet duct lower wall interfacing with and/or coupled to a bypass duct; an outlet duct lower wall interfacing with and/or coupled to a bypass duct; a heat exchanger coupled between the inlet duct lower wall and outlet duct lower wall wherein the heat exchanger is at a compound angle with respect to an inlet duct air flow direction; and a fairing coupled to the top of the heat exchanger wherein the fairing forms the inlet duct upper wall and the outlet duct upper wall.

In preferred embodiments, the compound angle is formed by tilting the heat exchanger forward or backward with respect to the inlet duct air flow direction and tilting the heat exchanger in at least one additional axis. The one other direction is typically a direction 90 degrees to forward or backward such as left to right or right to left. However, in different embodiments, any compound angle may be formed.

Rather than have a typical diffuser that slows down the inlet duct flow with an expanding cross sectional area, embodiments herein angle the heat exchanger. Accordingly, in the preferred embodiments, the inlet duct lower wall and the inlet duct upper wall form an inlet duct and the cross-section of the inlet duct perpendicular to the inlet duct air flow direction has a constant area, or near constant area. Of course, the constant area, or near constant area, only continues for as long as both walls extend along the flow direction.

In embodiments that are used in conjunction with engines, the heat exchanger assembly may be mounted to the engine casing. In some embodiments, the heat exchanger is curved to follow an engine casing contour. In embodiments where the heat exchanger is curved, the inlet duct lower wall, the outlet duct lower wall and the fairing may also all be curved to follow the engine casing contour.

In general, three basic configurations are taught herein with respect to the heat exchangers positioning relative the bypass duct. In some embodiments, the heat exchanger assembly is flush mounted. In other embodiments, the heat exchanger is semi-protruding into the bypass duct flow. In still yet other embodiments, the heat exchanger may be fully protruding into the bypass duct flow.

The heat exchanger itself may be custom designed to work optimally with the inlet duct. In some embodiments, the fin height and fin density are varied to match the flow profile of an inlet duct.

In preferred embodiments, the seal between the inlet duct and bypass duct and the seal between the outlet duct and bypass duct are accomplished with both an aerodynamic seal and a pressure/fire seal. In preferred embodiments, the inlet duct lower wall and the outlet duct lower wall are pressure/fire sealed to the bypass duct at about a 90 degree angle to a direction of a maximum relative motion between the heat exchanger assembly and an engine casing. As used herein about 90 degrees means between 80 degrees and 110 degrees. In other embodiments, other angles may be used with the primary importance being that the seal direction is not in line with the direction of maximum displacement between the engine casing and heat exchanger assembly. In preferred embodiments, the pressure/fire seal is a "P" seal although other seal designs may also be employed. In preferred embodiments, the aerodynamic seal is a "V" seal although other seal designs can also be employed.

In preferred embodiments, the inlet duct lower wall and the outlet duct lower wall are separate pieces and the heat exchanger is assembled between them. However, in some embodiments, the inlet duct lower wall and outlet duct lower wall are formed as a single piece. In some embodiments this may be formed by the inner bypass duct wall.

Some embodiments of heat exchanger assemblies may comprise: an inlet duct; an outlet duct; a heat exchanger coupled between the inlet duct and outlet duct wherein the heat exchanger is at a compound angle with respect to an inlet duct air flow direction; and a fairing coupled to the top of the heat exchanger.

In yet other embodiments a heat exchanger assembly is provided that comprises: an inlet duct; an outlet duct; a heat exchanger coupled between the inlet duct and outlet duct wherein the heat exchanger is at a compound angle with respect to an inlet duct air flow direction; and a fairing coupled to the top of the heat exchanger wherein the fairing forms the inlet duct upper wall and the outlet duct upper wall.

DETAILED DESCRIPTION OF THE PREFERRED EMBODIMENTS

The present patent document discloses embodiments of heat exchange assemblies and their integration. Preferably, the assemblies taught herein have increased efficiency and a decreased mounting footprint. Applicant's extensive research has demonstrated the benefits of inclining the intake plane of the heat exchanger to the inlet duct air flow direction. As used herein, the term "inlet duct air flow direction" means the dominant direction of travel of the airflow as it passes through the inlet duct. Where the walls of the inlet duct are parallel, the dominant direction may generally be assumed to be parallel to the walls. Where the walls of the inlet duct form a constant area, or near constant area, then the dominant flow direction may generally be assumed to be parallel with the centerline.

In various places throughout this patent document, reference is made to angling the heat exchanger. When this patent document refers to angling the heat exchanger, such a reference refers to the front plane or input plane of the heat exchanger. If the heat exchanger input plane is curved, the input plane is the plane tangent to the curved surface at the centerline of the inlet duct.

Inclining the intake plane of the heat exchanger to the inlet duct air flow direction increases the area of the heat exchanger along the intake plane that is in contact with the air in the inlet duct. Because the area of the heat exchanger in contact with the air duct is larger than the cross section of the inlet duct perpendicular to the air flow, a natural inlet diffuser is created as the air turns resulting in a very compact package. This is in contrast to a typical diffuser which expands the cross-section of the duct perpendicular to the flow direction to cause the flow to slow down in response to the Bernoulli principle which requires a long diffuser duct. Utilizing the turn in the flow for diffusion and maintaining an inlet duct of constant area, or near constant area. allows for a significantly shorter design.

Figure 1:
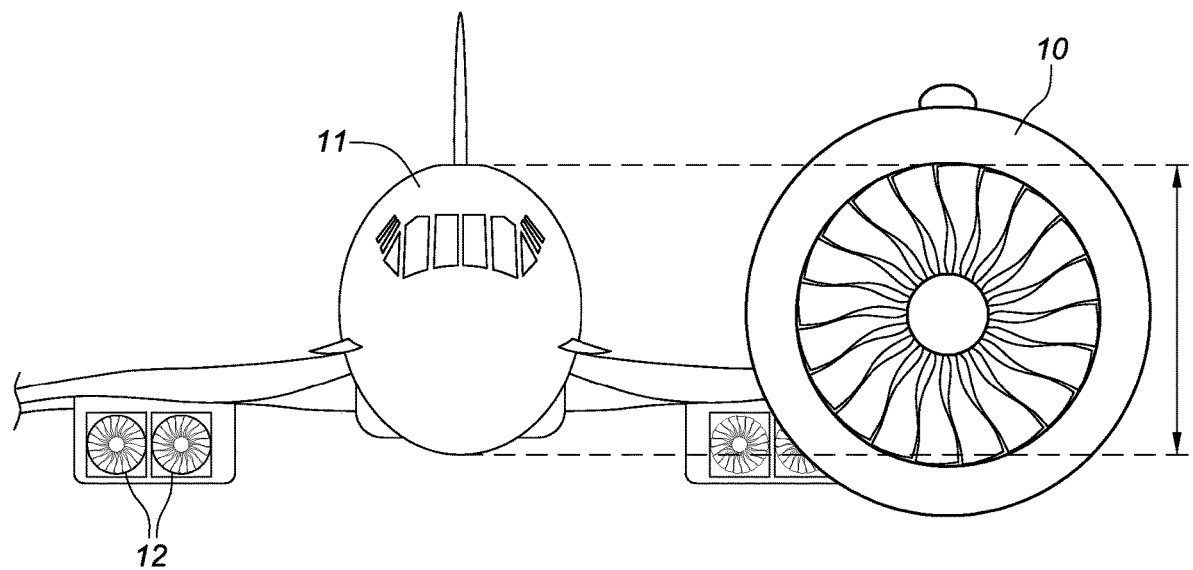
FIG. 1 illustrates a comparison of the relative size of present day engines with the fuselage of the Concorde.
Figure 2:
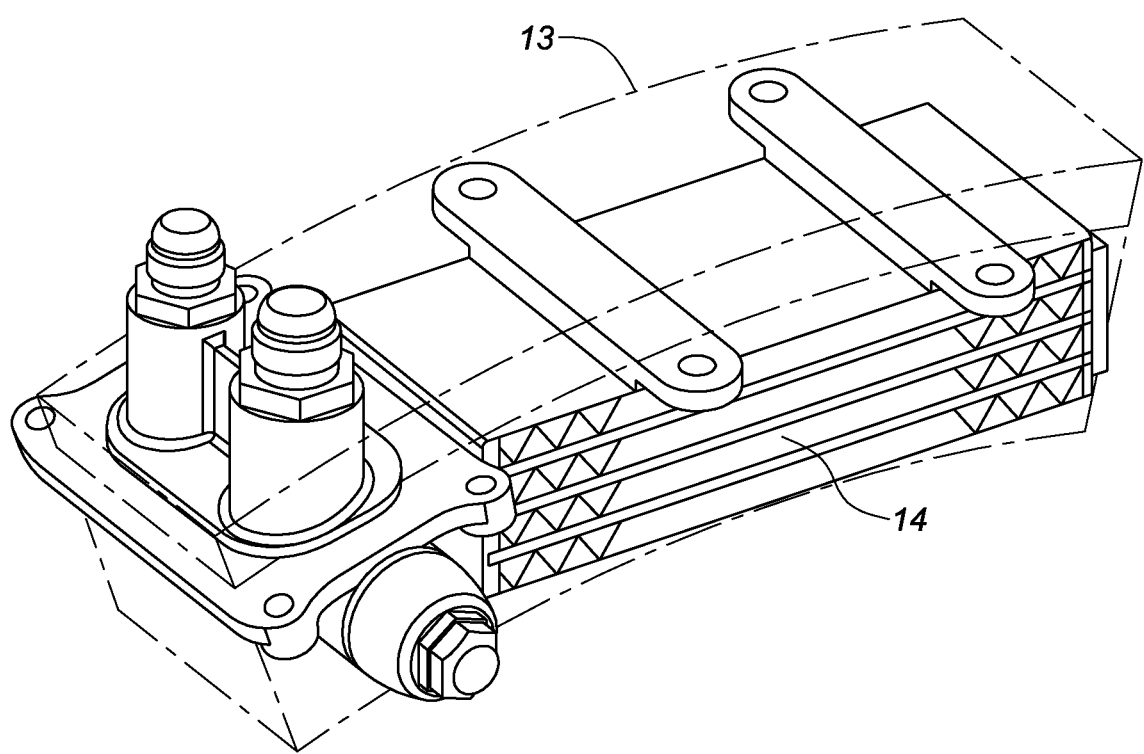
FIG. 2 illustrates a three-dimensional cross-section of one of Applicant's prior heat exchanger designs.
Figure 3:
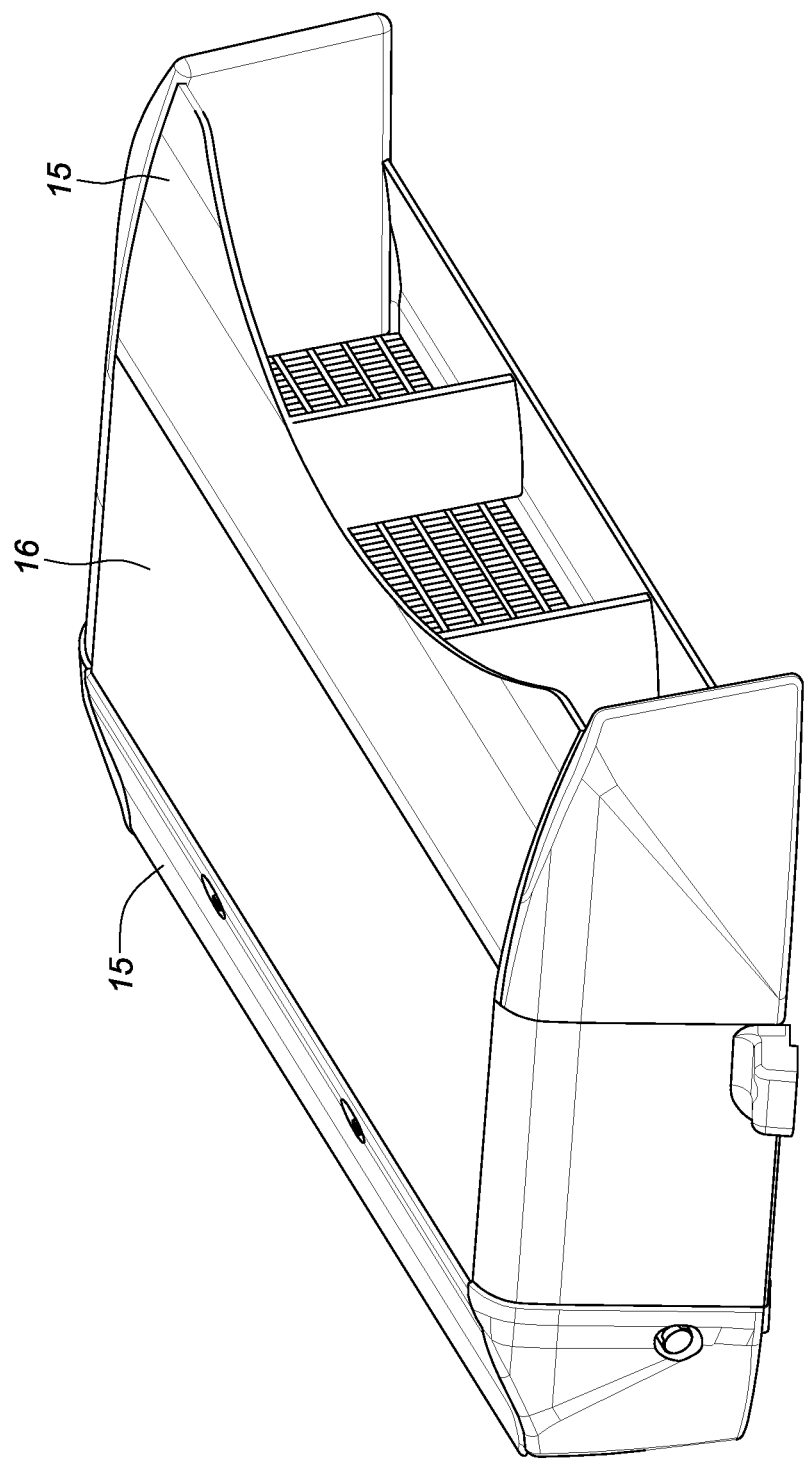
FIG. 3 illustrates a three-dimensional isometric view of one of Applicant's prior heat exchanger designs with diffusers.
Figure 4:
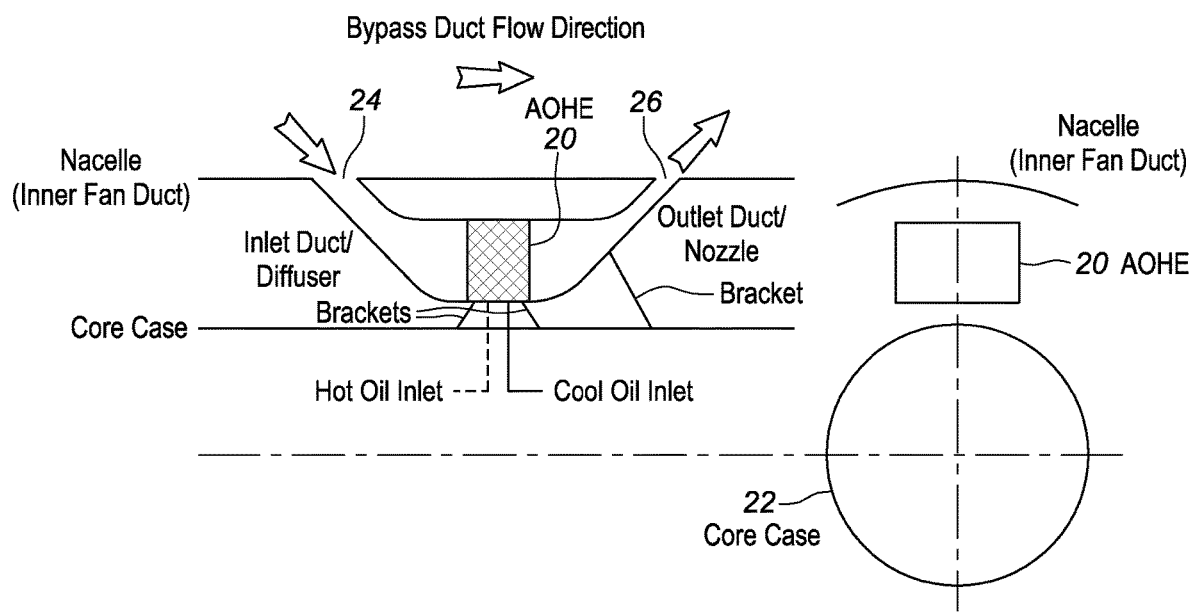
FIG. 4 illustrates a diagram of one of Applicant's prior heat exchanger designs mounted externally to the engine core.
Figure 5:
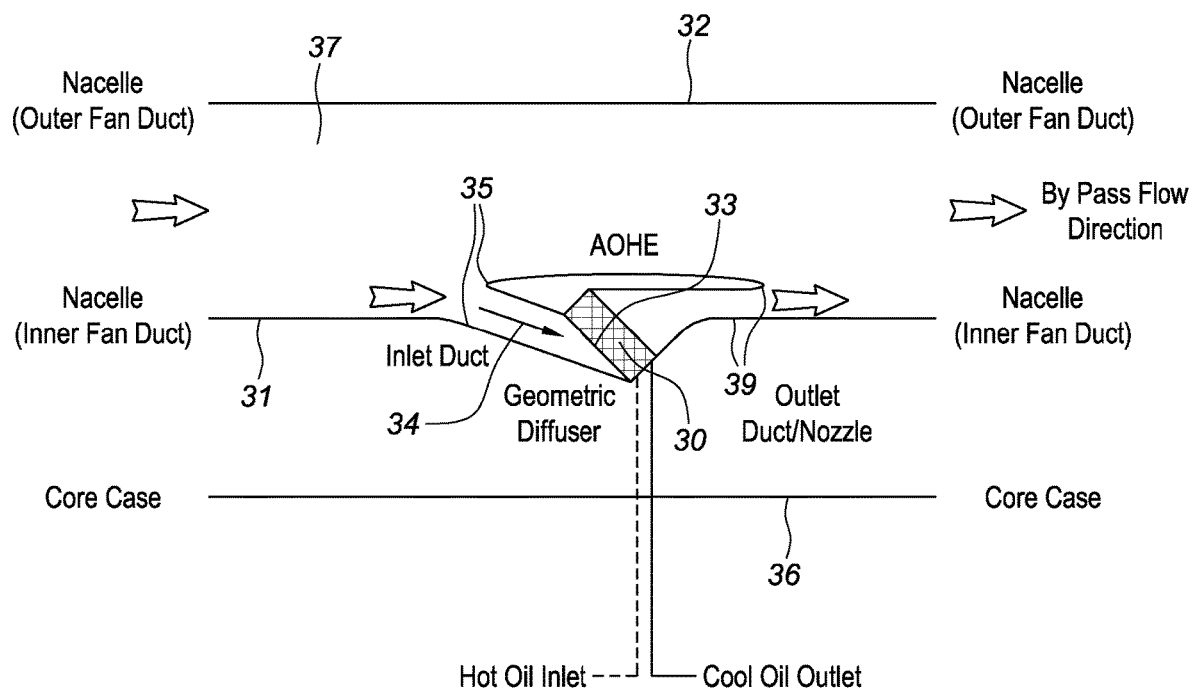
FIG. 5 illustrates a cross-sectional schematic view demonstrating one embodiment of a heat exchanger with the intake plane angled to the inlet duct air flow direction.

FIG. 5 illustrates a cross-sectional schematic view demonstrating one embodiment of a heat exchanger 30 with the intake plane 33 angled to the inlet duct air flow direction 34. As may be seen in FIG. 5, an inlet duct 35 takes low temperature air from the secondary flow stream 37 (bypass duct) and passes it through an inclined heat exchanger 30. The inclination of the heat exchanger 30, relative to the inlet duct air flow direction 34, provides the diffusion. Creating diffusion without the use of an actual diffuser allows for a more efficient and effective design. After passing through the heat exchanger 30, the air is then returned, via an outlet duct 39, back into the bypass duct 37 with minimal pressure loss and flow disturbance. This arrangement also allows for a heat exchanger assembly that is significantly smaller in size than a traditionally designed and sized assembly.

Although in FIG. 5 the inclination is depicted as being fore to aft, the inclination could also be aft to fore. In other embodiments, the inclination could be left to right or right to left (into the page or out of the page). In addition, the inclination could also be a compound angle. For example, in addition to being fore to aft, the inclination could also be, left to right relative to the engine, depending on specific requirements. In other embodiments, other angles between the intake plane 33 of the heat exchanger 30 and the inlet duct air flow direction 34 may be used. Any angle that increases the surface area of the heat exchanger along the intake plane with respect to the cross-section of the inlet duct may be used.

As may be appreciated, angling the heat exchanger 30 to create the diffusion instead of creating diffusion by increasing the area of the inlet duct as it approaches the heat exchanger 30 creates a smaller inlet duct 35 and thus, allows for a more compact design. In addition, angling the heat exchanger 30 allows for a lower profile of the heat exchanger and ducting allowing the entire assembly to have a lower height significantly helping its integration with the engine and bypass duct. This creates a much smaller overall packaged design in the parent engine.

Figure 6A:
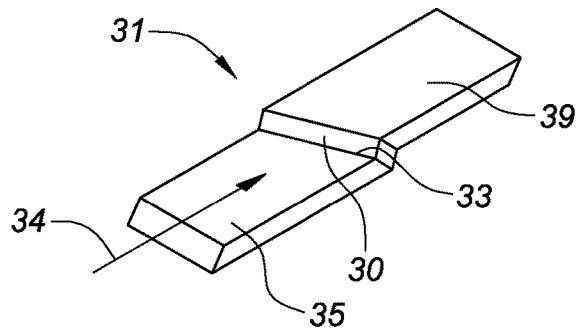
FIG. 6A illustrates an isometric schematic view of an assembly with a heat exchanger at a compound angle to the inlet duct air flow direction.

FIGS. 6A-6E illustrate an embodiment wherein the heat exchanger has a compound angle with respect to the inlet duct air flow direction 34. FIG. 6A illustrates an isometric schematic view of an assembly 31 with a heat exchanger 30 at a compound angle to the inlet duct air flow direction 34. As may be seen in FIG. 6A, the inlet duct 35 and outlet duct 39 are on either side of the heat exchanger 30. The inlet duct mean air flow direction 34 is parallel to the center line of the walls of the inlet duct 34. In the embodiment shown in FIGS. 6A-6E, the heat exchange 30 and its intake plane 33 are angled away from the inlet duct air flow direction 34 from top to bottom and also away from the inlet duct air flow direction 34 from left to right creating a compound angle. In some embodiments, the assembly 31 would be installed in the next level assembly with the inlet duct air flow direction 34 parallel to the engine centerline. To this end, the heat exchanger would be angled toward or away from the engine from front to back and also angled from left to right with respect to a plane perpendicular to the engine centerline.

Figure 6B:
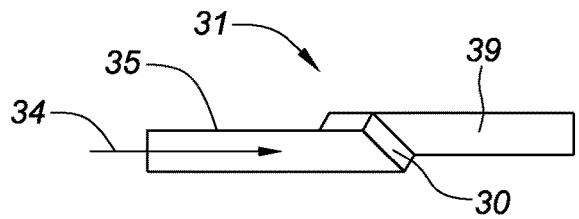
FIG. 6B illustrates a side plan view of the heat exchanger assembly of FIG. 6A.

FIG. 6B illustrates a side plan view of the assembly 31 of FIG. 6A. As may be seen in FIG. 6B due to the inclination of the heat exchanger 30, the inlet duct 35 is slightly lower than the outlet duct 39. The amount of offset depends on the inclination of the heat exchanger 30 and the size of the inlet duct 35 and outlet duct 39.

Figure 6C:
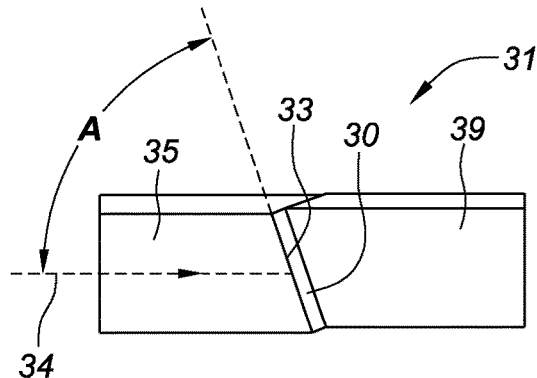
FIG. 6C illustrates a top plan view of the heat exchanger assembly of FIG. 6A.

FIG. 6C illustrates a top plan view of the assembly 31 of FIG. 6A. In FIG. 6C, Angle A has been labeled to illustrate the left to right angle between the intake plane 33 of the heat exchanger 30 and the inlet duct air flow direction 34.

Figure 6D:
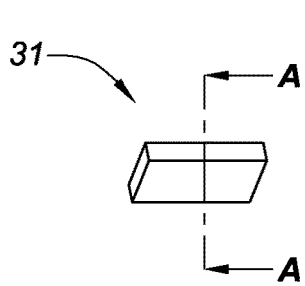
FIG. 6D illustrates a front plan view of the heat exchanger assembly of FIG. 6A.

FIG. 6D illustrates a front plan view of the assembly 31 of FIG. 6A. FIG. 6D illustrates section A-A which is illustrated in FIG. 6E.

Figure 6E:
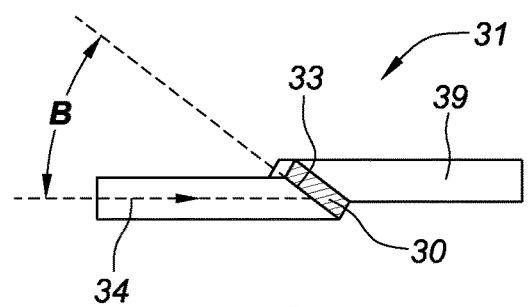
FIG. 6E illustrates section A-A of the heat exchanger assembly from FIG. 6A.

FIG. 6E illustrates section A-A of the assembly 31 of FIG. 6D. In FIG. 6E, Angle B has been labeled to illustrates the fore to aft angle between the intake plane 33 and the heat exchanger 30 and the inlet duct air flow direction 34.

The heat exchanger 30 may be set at any overall compound angle and may be tipped forward or backward or left or right in any combination of angular tilt. In a preferred embodiment, the heat exchanger 30 is tipped forward/backward with angle B between 10 degrees and 60 degrees. In an even more preferred embodiment, the heat exchanger 30 is tipped forward/backward with angle B between 20 degrees and 40 degrees. In combination with, or in isolation from, the forward/backward tip, the heat exchanger 30 is tipped sideways with angle A between 10 degrees and 90 degrees. In an even more preferred embodiment, the heat exchanger 30 is tipped sideways between 20 degrees and 40 degrees.

Figure 7A:
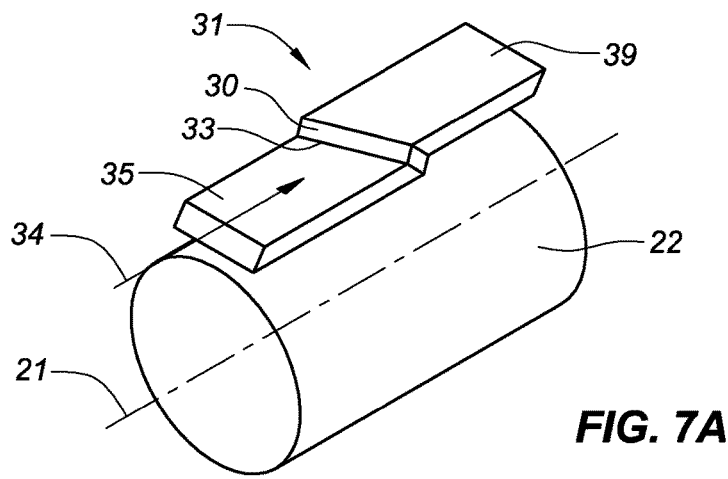
FIG. 7A illustrates an isometric schematic view of an assembly including a heat exchanger assembled above the engine core casing.

FIGS. 7A-7E illustrate the location of the embodiment of FIGS. 6A-6E with respect to the engine core casing 22. FIG. 7A illustrates an isometric schematic view of an assembly 31 including a heat exchanger 30 assembled above the engine core casing 22. The intake plane 33 and the heat exchanger 30 are inclined in the forward direction with respect to the inlet duct flow direction 34 and/or the engine center line 21. In addition, the intake plane 33 and the heat exchanger 30 spiral around the engine casing 22 of the engine forming a compound angles relative to both the inlet duct flow direction 34 and to the engine center line 22.

Figure 7B:
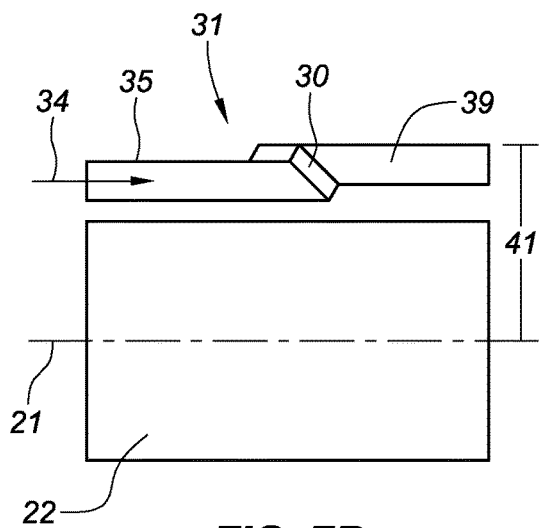
FIG. 7B illustrates a side plan view of the heat exchanger assembly of FIG. 7A.

FIG. 7B illustrates a side plan view of the assembly 31 of FIG. 7A. In this view, the distance 41 between the engine centerline 21 and the top of the assembly 31 may be seen. By angling the heat exchanger 30 from front to back, the distance 41 can be reduced. Accordingly, a more compact assembly design can be achieved.

Figure 7C:
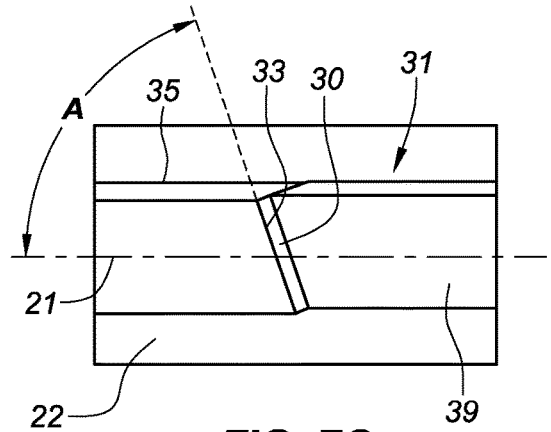
FIG. 7C illustrates a top plan view of the heat exchanger assembly of FIG. 7A.

FIG. 7C illustrates a top plan view of the assembly 31 of FIG. 7A. As may be seen in FIG. 7C, the front plane 33 and the heat exchanger 30 are angled by Angle A with respect to the inlet duct flow direction 34 and/or the engine centerline 21.

Figure 7D:
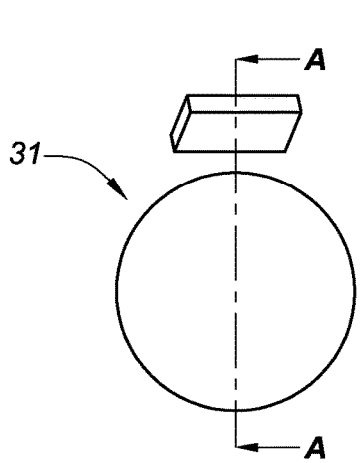
FIG. 7D illustrates a front plan view of the heat exchanger assembly of FIG. 7A.
Figure 7E:
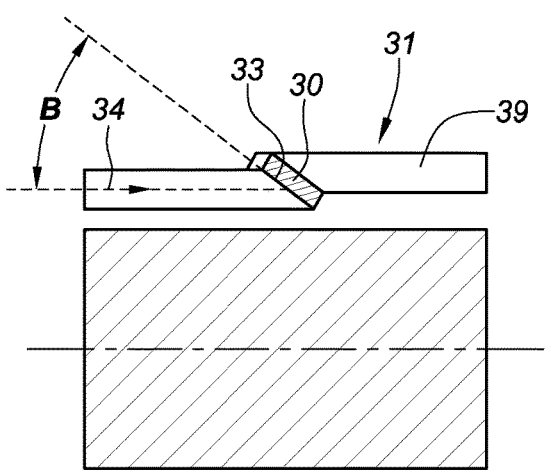
FIG. 7E illustrates section A-A of the heat exchanger assembly from FIG. 7A.
Figure 8A:
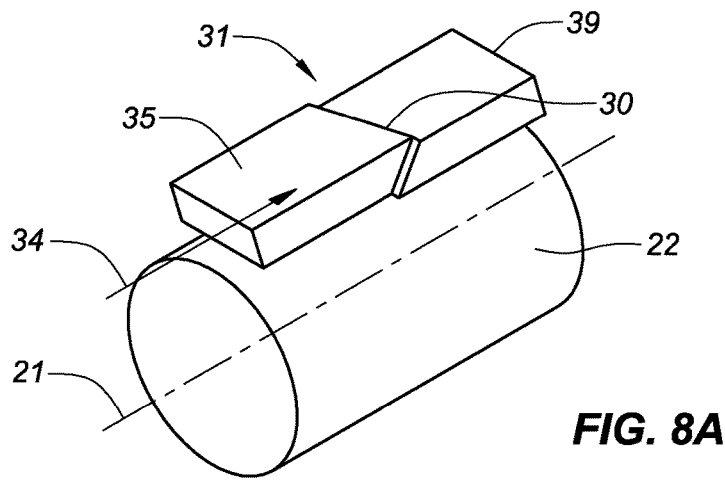
FIG. 8A illustrates an isometric schematic view of an assembly including a heat exchanger assembled above the engine core casing.
Figure 8B:
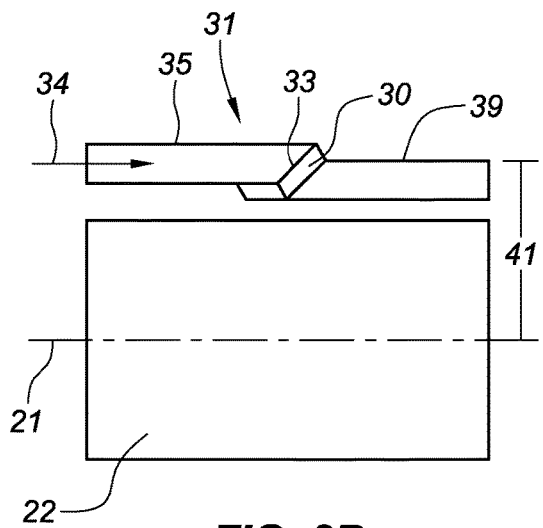
FIG. 8B illustrates a side plan view of the heat exchanger assembly of FIG. 8A.
Figure 8C:
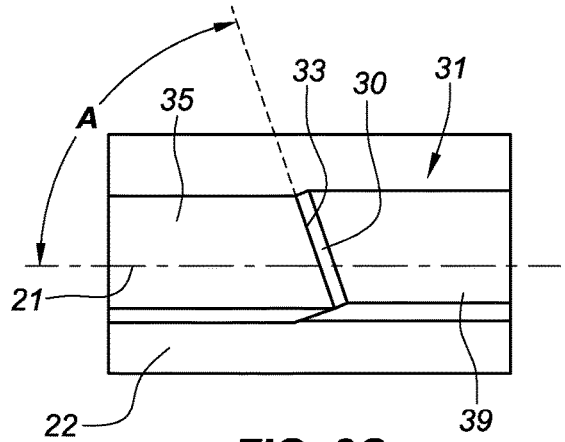
FIG. 8C illustrates a top plan view of the heat exchanger assembly of FIG. 8A.
Figure 8D:
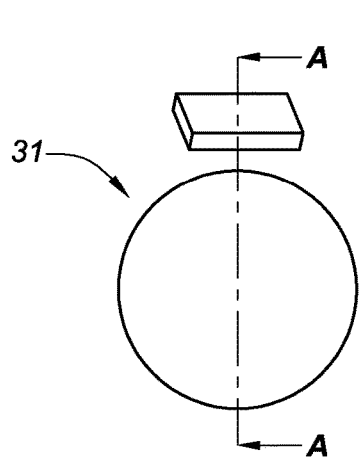
FIG. 8D illustrates a front plan view of the heat exchanger assembly of FIG. 8A.
Figure 8E:
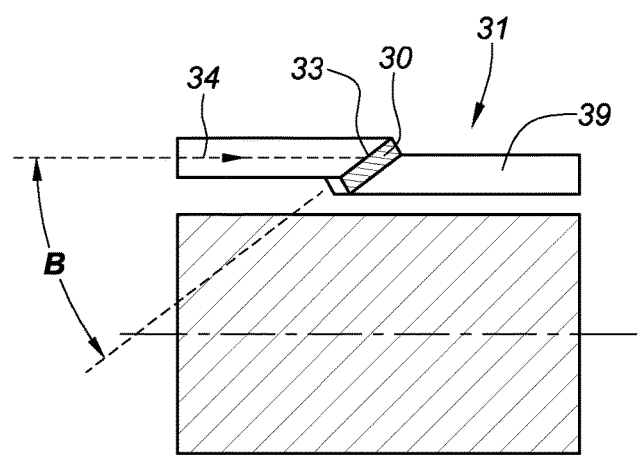
FIG. 8E illustrates section A-A of the heat exchanger assembly from FIG. 8A.

FIG. 7D illustrates a front plan view of the assembly 31 of FIG. 7A. FIG. 7D illustrates section A-A which is illustrated in FIG. 7E. As may be seen in FIG. 7E, the front plane 33 and the heat exchanger 30 are angled by Angle B with respect to the inlet duct air flow direction 34 and/or the engine centerline 21.

FIGS. 8A-8E illustrate a similar embodiment to the one shown in FIGS. 7A-7E except the frontal plane 33 and the heat exchanger 30 are angled rearward, away from the inlet duct from the bottom to the top. Similar to the embodiment in FIGS. 7A-7E, the embodiment shown in FIGS. 8A-8E also spirals around the engine casing 22 forming a compound angle (A+B) relative to the inlet duct flow direction 34 and/or engine center line 21.

FIGS. 9A-9E illustrate an embodiment of an assembly 40 with multiple heat exchangers at symmetrical or different compound angles to the inlet duct air flow direction 34 and the engine centerline 21.

Figure 9A:
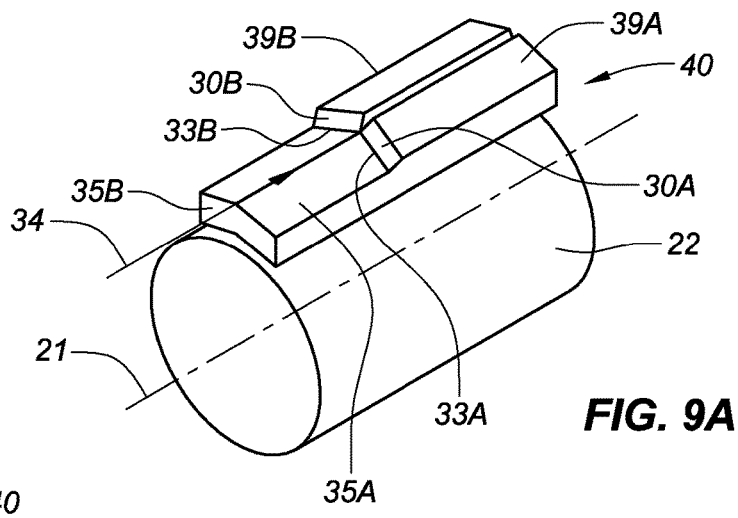
FIG. 9A illustrates an isometric schematic view of an assembly including one or more heat exchangers assembled above the engine core casing.
Figure 9B:
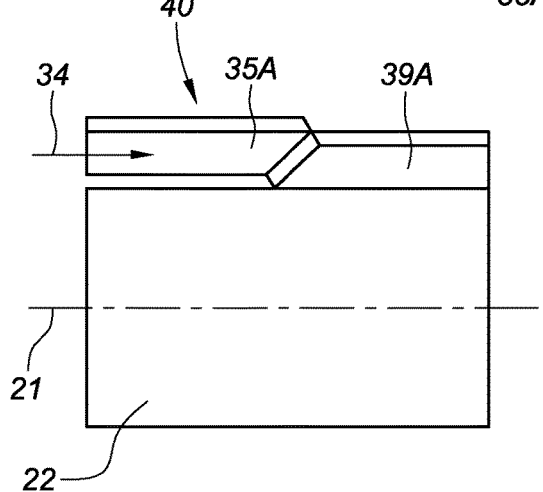
FIG. 9B illustrates a side plan view of the heat exchanger assembly of FIG. 9A.
Figure 9C:
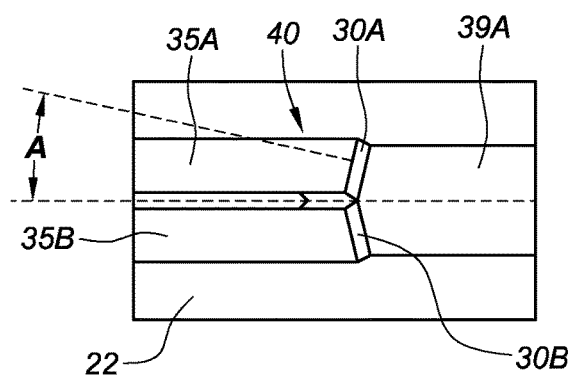
FIG. 9C illustrates a top plan view of the heat exchanger assembly of FIG. 9A.

FIG. 9A illustrates an isometric schematic view of an assembly 40 with multiple heat exchangers 30A and 30B both at compound angles to the inlet duct air flow direction 34 and the engine centerline 21. In addition to being at compound angles to the inlet duct air flow direction 34 and the engine centerline 21, the heat exchangers 30A and 30B are also at a compound angle to each other.

FIG. 9A illustrates an isometric schematic view of the assembly 40 with multiple heat exchangers 30A and 30B assembled above the engine core casing 22. Although in general FIGS. 9A-9E will be referred to as having two separate heat exchangers 30A and 30B, embodiments may exist where a similarly configured assembly with a similar layout and shape is achieved by a single heat exchanger. Other embodiments have heat exchanger arrays comprising three or more heat exchangers.

As may be seen in FIG. 9A, both heat exchangers 30A and 30B are angled forward with their tops closer to the front of the engine than their bottoms. However, in other embodiments, the heat exchangers 30A and 30B may be angled backward with their bottoms closer to the front of the engine than their tops. In yet other embodiments, one heat exchanger could be angled forward while the other heat exchanger is angled backward.

As may also be seen in FIG. 9A, the two heat exchangers 30A and 30B are angled in opposite directions with respect to the inlet duct air flow direction 34 and the engine centerline 21. Heat exchanger 30A is angled from left to right with the right side closer to the front of the engine and the left side closer to the aft of the engine. Heat exchanger 30B is angled from right to left with the right side closer to the aft of the engine and the left side closer to the front of the engine. Accordingly, an assembly is formed where the adjacent inside edges of the heat exchangers 30A and 30B align along the engine centerline 21 and the outside edges are both closer to the front of the engine. In other embodiments, the left to right inclinations could be reversed such that the inside edges of the heat exchangers 30A and 30B would still be adjacent and align over the engine centerline 21 but would be closer to the front of the engine than the two outside edges of the heat exchangers 30A and 30B.

Figure 9D:
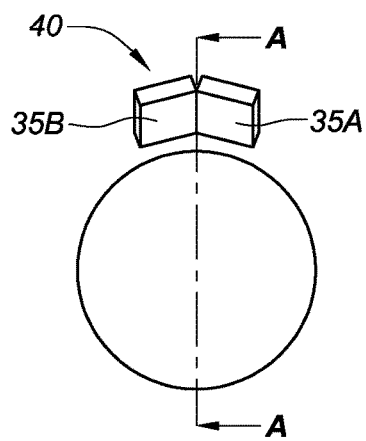
FIG. 9D illustrates a front plan view of the heat exchanger assembly of FIG. 9A.
Figure 9E:
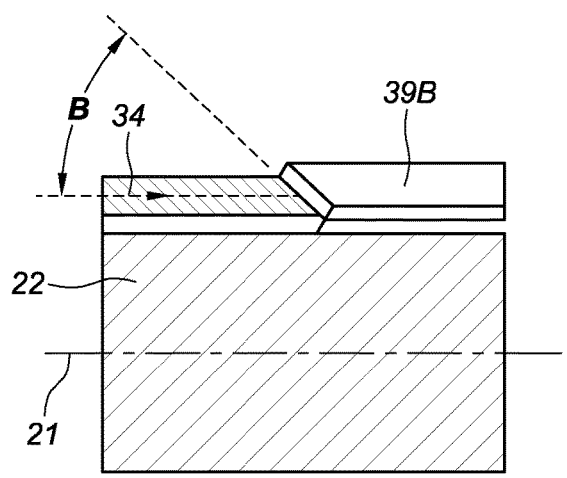
FIG. 9E illustrates section A-A of the heat exchanger assembly from FIG. 9A.

In addition to being angled forward or backward and left to right or right to left, the heat exchangers 30A and 30B may be angled around the circular circumference of the engine casing. FIG. 9D illustrates a front planer view of the assembly 40 of FIG. 9A. As may be seen in FIG. 9D, multiple adjacent heat exchangers may be angled such that they follow the contour of the outside circumference of the engine casing 22. By angling and assembling adjacent heat exchangers around the circumference of the case, the overall distance from the engine centerline 21 to the outside of the heat exchangers is minimized. As may be seen in FIG. 9D, the heat exchangers 30A and 30B are positioned such that the bottom corners of each exchanger are the same or approximately the same distance from the engine casing centerline 21. This may be achieved through a series of angling in cartesian coordinates or a rotation in polar coordinates; the result is the same.

Although FIGS. 9A-9E illustrate two heat exchangers 30A and 30B, in other embodiments more than two heat exchangers may be used. In some embodiments, the pattern formed by heat exchangers 30A and 30B may be repeated around the outside of the engine casing 22. In yet other embodiments, other orientations of one or more heat exchangers may be used.

The pair of heat exchangers depicted in FIGS. 9A-9E are symmetrical about the centerline. The pair of heat exchangers are mirror images of each other about the centerline. While this is the embodiment shown, in other embodiments, non-symmetrical heat-exchangers may be used. In non-symmetric embodiments, the size or inclination of either heat exchanger may be varied. In some embodiments, various different heat exchangers with various sizes and/or inclinations may be used around the engine casing.

In embodiments that use multiple heat exchangers, the heat exchangers may be on the same fluid circuit or on separate/independent circuits. If more than two heat exchangers are used, multiple heat exchangers may be on one circuit while one or more heat exchangers are on another fluid circuit.

While the embodiments that have been described up to this point have all shown square or rectangular ducting and square or rectangular heat exchangers, there is no requirement for this particular shape. This becomes especially true when you consider the engine casing 22 is a cylindroid.

FIGS. 10A-10E illustrate an embodiment wherein the heat exchanger 30 and ducting 35 and 39 has been swept through an angle around the engine casing 22. If we assume the orientations of the heat exchanger 30 and the intake plane 33 to the heat exchanger 30, are defined by a plane tangent to the curved surface at the centerline of the input duct 35, it may be said that the intake plane 33 and the heat exchanger 30 are at a compound angle to the inlet duct air flow direction 34 and the engine centerline 21. Accordingly, the embodiment shown in FIG. 10A-10E is similar to the embodiment shown in FIGS. 7A-7E except the heat exchanger 30 and ducting 35 and 39 are swept through an arc and curved instead of square/rectangular. The inclined/compound inclined heat exchanger 30 is swept in an arc to follow the engine case 22 contour to minimize the deviation from the engine case contour. As well as following the curvature of the engine core casing 22, the heat exchanger 30 could also fit around any other accessories/equipment within the engine core zone.

Figure 10A:
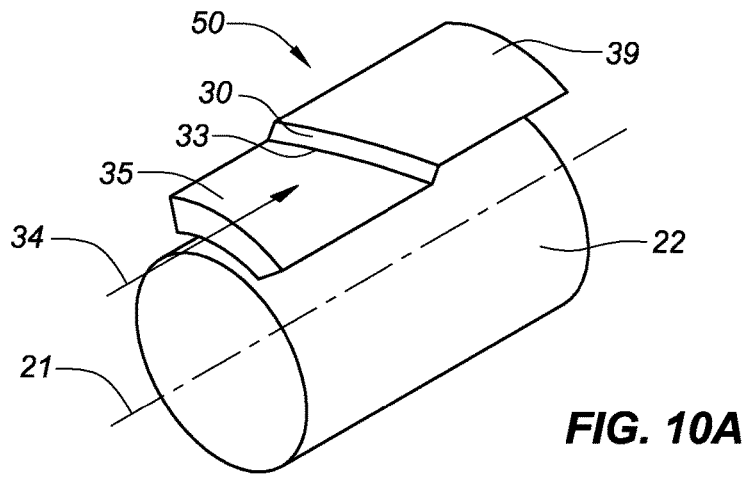
FIG. 10A illustrates an isometric schematic view of an assembly including a curved heat exchanger assembled above the engine core casing.

FIG. 10A illustrates an isometric schematic view of the assembly 50 with an arced heat exchanger and ducting assembled above the engine core casing 22. As may be seen in FIGS. 10A-10E, the heat exchanger matrix describes an arc. The curvature of the heat exchanger 30 could either follow a constant radius arc or follow a more complex shape such as a parabolic arc or some other more complex curve.

As may be appreciated from FIG. 10A, the intake plane 33 and the heat exchanger 30 are both at a compound angle to the inlet duct air flow direction 34 and the engine centerline 21. In the embodiment shown in FIG. 10A, the intake plane 33 and the heat exchanger 30 are angled forward (relative to the stream-wise flow direction) with the top of the heat exchanger 30 being closer to the front of the engine and the bottom of the heat exchanger 30 being closer to the aft of the engine. The forward angle of the heat exchanger 30 may be clearly seen in FIG. 10E as Angle B.

In addition, in the embodiment shown in FIG. 10A, the intake plane 33 and the heat exchanger 30 are angled from left to right, the left side of the heat exchanger 30 being closer to the front of the engine and the right side of the heat exchanger 30 being closer to the aft of the engine. This is illustrated in FIG. 10C as Angle A.

Figure 10B:
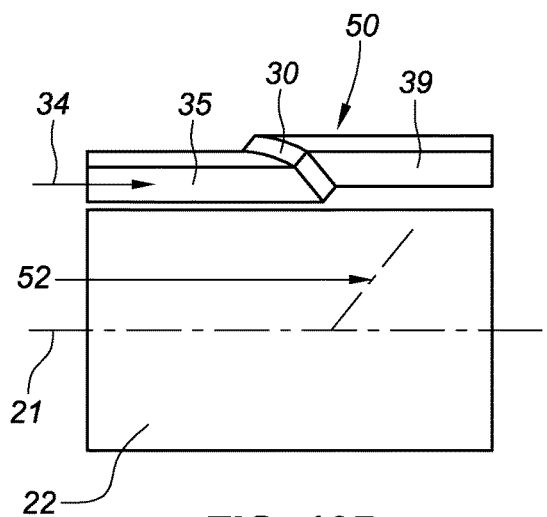
FIG. 10B illustrates a side plan view of the heat exchanger assembly of FIG. 10A.
Figure 10C:
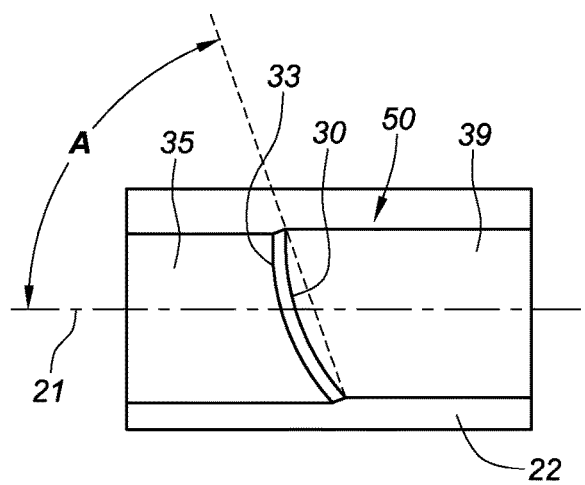
FIG. 10C illustrates a top plan view of the heat exchanger assembly of FIG. 10A.

Referring to FIG. 10B, the radius of curvature of the heat exchanger 30 is defined by the axis of rotation 52. As may be seen in FIG. 10B, the axis of rotation 52 of the heat exchanger is not the same axis as the engine centerline 21. This is primarily because the heat exchanger 30 is angled down and thus, the axis of rotation 52 is also angled with respect to the engine centerline 21. The axis of rotation 52 of the embodiment of FIGS. 10A-10E is behind the heat exchanger due to its downward angle.

The diameter of the heat exchanger defined by the location of axis of rotation 52 may be smaller or larger than the curvature of the engine casing.

Figure 10D:
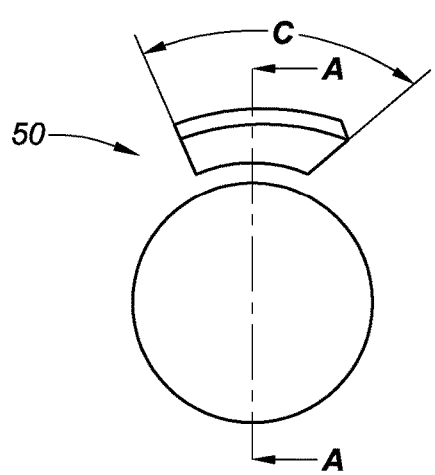
FIG. 10D illustrates a front plan view of the heat exchanger assembly of FIG. 10A.
Figure 10E:
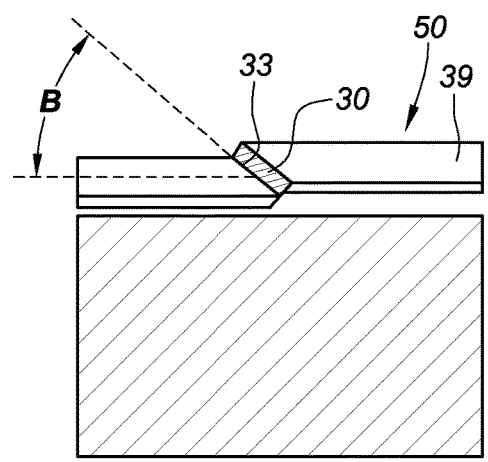
FIG. 10E illustrates section A-A of the heat exchanger assembly from FIG. 10A.
Figure 11A:
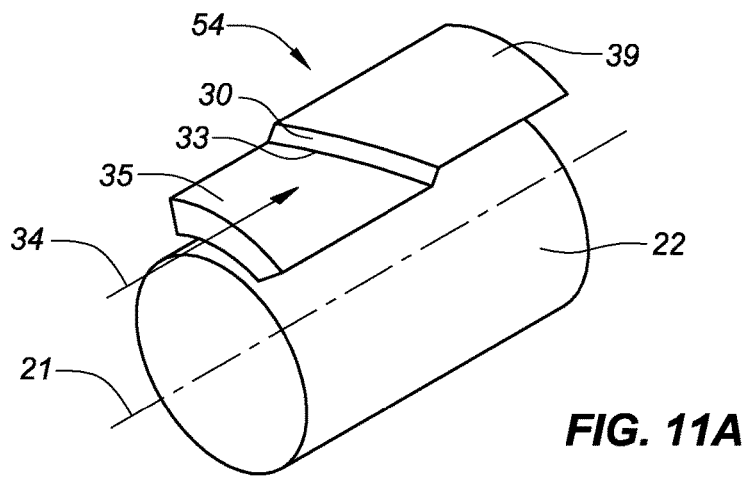
FIG. 11A illustrates an isometric schematic view of an assembly including a curved heat exchanger assembled above the engine core casing.
Figure 11B:
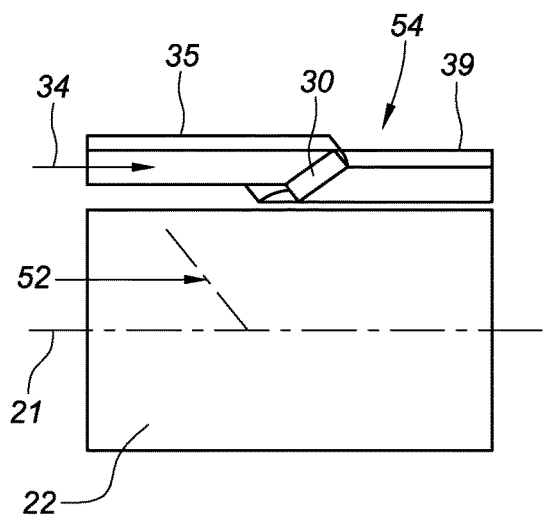
FIG. 11B illustrates a side plan view of the heat exchanger assembly of FIG. 11A.
Figure 11C:
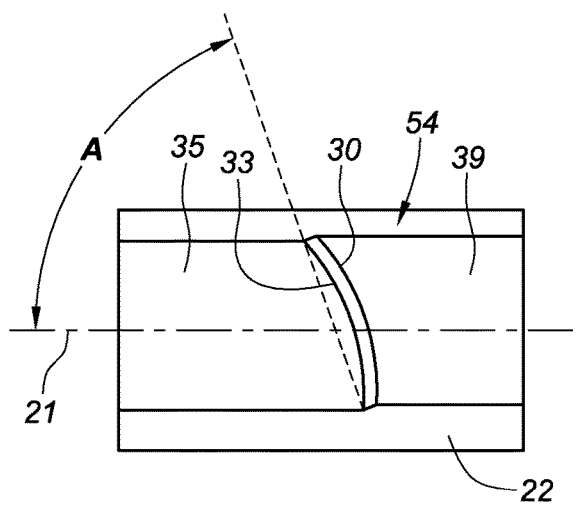
FIG. 11C illustrates a top plan view of the heat exchanger assembly of FIG. 11A.
Figure 11D:
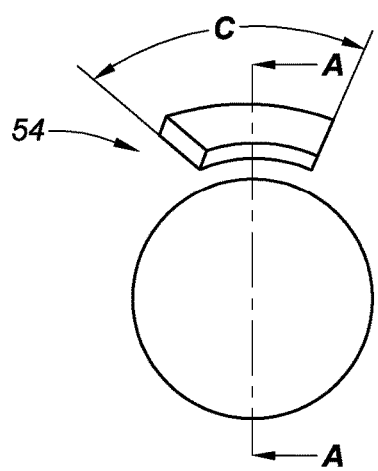
FIG. 11D illustrates a front plan view of the heat exchanger assembly of FIG. 11A.
Figure 11E:
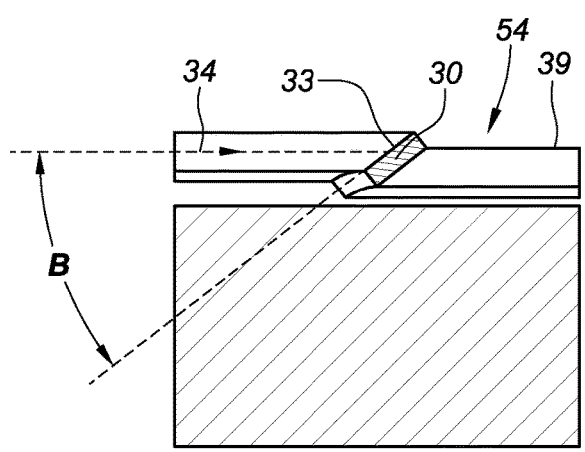
FIG. 11E illustrates section A-A of the heat exchanger assembly from FIG. 11A.

Referring to FIG. 10D, it may be seen that in the embodiment shown in FIGS. 10A-10E, the ducting 35 and 39 and the heat exchanger 30 are swept through the angle C. In the embodiment shown in FIGS. 10A-10E, angle C is between 15 and 30 degrees. However, in other embodiments, a smaller or large sweep angle may be used. It may be appreciated that as the sweep angle increases, more of the engine casing 22 is surrounded.

FIGS. 11A-11E illustrate a similar embodiment to the one shown in FIGS. 10A-10E except the frontal plane 33 and the heat exchanger 30 are angled rearward, away from the inlet duct from the bottom to the top. Similar to the embodiment in FIGS. 10A-10E, the embodiment shown in FIGS. 11A-11E also sweeps around the engine casing 22 forming a compound angle (A+B) relative to the engine center line 21.

In various different embodiments, the heat exchanger may protrude into the bypass duct by varying amounts. In some embodiments, the heat exchanger may be completely protruding into the bypass duct. In other embodiments, the heat exchanger may be semi-protruding into the bypass duct. In yet other embodiments, the heat exchanger may be flush mounted such that it does not protrude into the bypass duct at all. These different embodiments may be implemented depending on the various different requirements of the overall assembly. In addition, many different embodiments of each configuration are possible.

Figure 12:
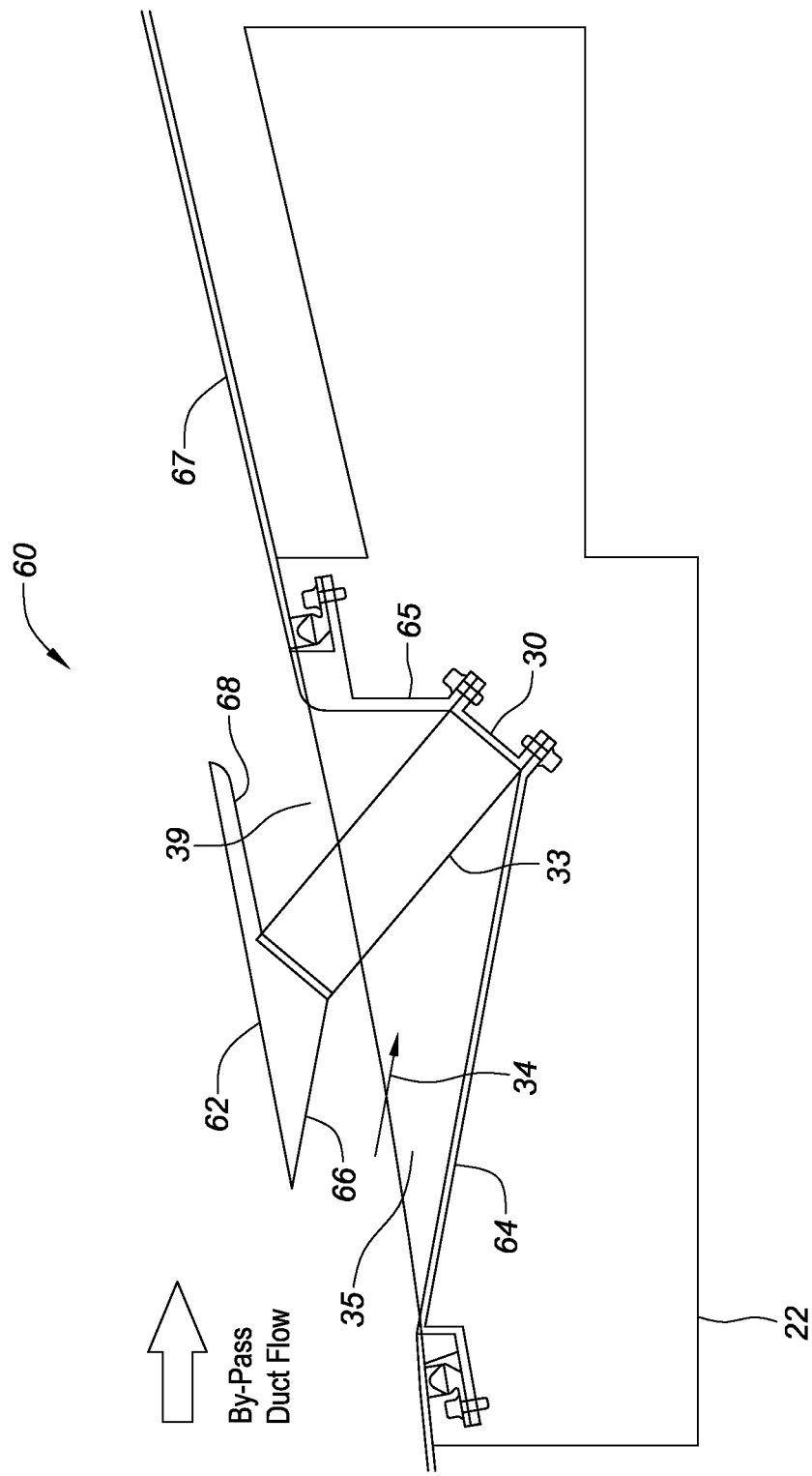
FIG. 12 illustrates a cross-section view of a semi-protruding, forward inclined heat exchanger assembly.

FIG. 12 illustrates a cross-section view of a semi-protruding, forward inclined heat exchanger assembly 60. As may be seen in FIG. 12, the assembly 60 comprises a heat exchanger 30, an inlet duct lower wall 64, an outlet duct lower wall 65, and a fairing 62. The fairing 62 provides both the inlet duct upper wall 66 and the outlet duct upper wall 68.

In the embodiment of FIG. 12, the main mechanical connection for the fairing 62 is the top surface of the heat exchanger 30. While in general the fairing 62 can be connected in any manner, in many embodiments, the main mechanical connection for the fairing 62 is the top of the heat exchanger 30. In such embodiments, the fairing may only be secured to the top of the heat exchanger 30 or may be attached to the top of the heat exchanger 30 and secured in other areas as well, for example, around its periphery.

In the embodiment shown in FIG. 12, the assembly is fastened to the engine core case via brackets which are not depicted. A portion of the inner fan duct is cut out to allow for the heat exchanger assembly 60. However, in other embodiments, other methods of coupling the inlet and outlet ducts to the inner fan duct may be used including welding and riveting or even in some cases, a monolithic construction where the wall of the inner fan duct is actually shaped to allow integration to the heat exchanger assembly 30. In assemblies with an inner fan duct that was already shaped to receive the heat exchanger 30, the inlet duct lower wall 64 and outlet duct lower wall 65 would be formed by the shaped inner fan duct. The heat exchanger and accompanying fairing would couple/bolt directly to the formed inner fan duct wall.

In the embodiment of FIG. 12, the inlet duct lower wall 64 and outlet duct lower wall 65 are both attached to the heat exchanger assembly. The heat exchanger 30 is then attached to the engine core case via brackets which are not depicted. The fairing 62 is attached to the top surface of the heat exchanger 30.

In the embodiment of FIG. 12, the fairing 62 has four main surfaces. The bottom front surface of the fairing 62 forms the upper inlet duct upper wall 66 surface. The bottom middle surface of the fairing 62 mates with the top surface of the heat exchanger 30. The bottom rear surface of the fairing 62 forms the outlet duct upper wall surface 68. The top surface connects the three bottom surfaces to complete the shape of the fairing 62. On the front of the fairing 62, the transition from the front bottom surface to the top surface may be a sharp point. On the back of the fairing 62, the transition from the bottom back surface to the top may be rounded to produce a better flow and reduce turbulence and/or drag.

In the embodiment of FIG. 12, the inlet duct upper wall 66 and the inlet duct lower wall 64 remain parallel throughout their length and form an inlet duct 35 with a cross-section that has a constant area, or near constant area, along the flow direction 34. The heat exchanger 30 is angled forward into the inlet duct 35 such that the intake plane 33 is angled forward with respect to the inlet duct air flow direction 34. As may be appreciated from the previous explanations, the intake plane 33 and heat exchanger 30 may also be angled left to right, right to left, back to front or at a compound angle to the inlet duct air flow direction 34.

The outlet duct upper wall 68 and the outlet duct lower wall 65 form the outlet duct 39. The outlet duct 39 does not have a cross-section with a consistent area but rather has a cross-section whose area narrows as the outlet duct extends towards the aft portion of the engine. Accordingly, the air leaving the heat exchanger 30 is sped back up via the Bernoulli principal prior to being injected back in the bypass duct flow. In other embodiments, the air leaving the heat exchanger 30 is sped back up via the Bernoulli principal prior to being ejected downstream of the engine cold flow thrust nozzle.

In the embodiment shown in FIG. 12, the inlet duct lower wall 64 is comprised of a single piece. In this embodiment, the inlet duct lower wall 64 is comprised of an elongated flat surface portion with functional interfaces on each end. The elongated surface forms the primary flow surface of the inlet duct lower wall 64 and the functional surfaces are used to interface with the inner fan duct, and secure to the heat exchanger 30 on the other end.

Similar to the inlet duct lower wall 64, the outlet duct lower wall 65 is formed by an elongated surface with functional interfaces at each end. However, in the embodiment of FIG. 12, the elongated portion of the outlet duct lower wall 65 is shorter than the elongated portion of the inlet duct lower wall 64. The functional interfaces on each end of the outlet duct lower wall 65 are used to interface the outlet duct lower wall 65 to the inner fan duct on one side and fasten to the heat exchanger 30 on the other side.

Functional interfaces could be tabs or flanges to support pressure, fire and/or aerodynamic seals to interface with the bypass duct inner wall. However, in other embodiments, any other type of interface or coupling may be used.

The heat exchanger 30 is held in place by coupling each side of the bottom of the heat exchanger to the engine core case via brackets which are not depicted. In the embodiment shown in FIG. 12, the heat exchanger 30 includes a tab/flange on each side of the bottom surface in order to couple the heat exchanger 30 to the inlet duct lower wall 64 and the outlet duct lower wall 65 respectively. The transition of the elongated section to the rear tab may be rounded to allow reduced turbulence and/or reduced drag.

In the embodiment of FIG. 12, the heat exchanger assembly 61 is semi-protruding into the bypass duct. In embodiments that are considered "semi-protruding" some of the heat exchanger resides below the aerodynamic surface of the inner fan duct and the remainder of the heat exchanger and the fairing on top of the heat exchanger reside above the aerodynamic surface of the inner fan duct.

In preferred embodiments, the intake plane 33 of the heat exchanger 30 is always angled relative to the stream-wise flow direction 34 in the inlet duct 35. The angle may be in a single direction or may be a compound angle comprised of angling the heat exchanger 30 in multiple direction with respect to the stream-wise flow direction 34 in the inlet duct 35. In some embodiments, the intake plane 33 of the heat exchanger 30 is angled in any plane with respect to the stream-wise flow direction 34 in the inlet duct 35.

The diffusion is done as the airflow turns from the inlet duct 35 into the heat exchanger 30. Angling the heat exchanger 30, allows the inlet duct 35 to be shorter than a traditional diffuser, which requires length to avoid stalling/separation.

Figure 13:
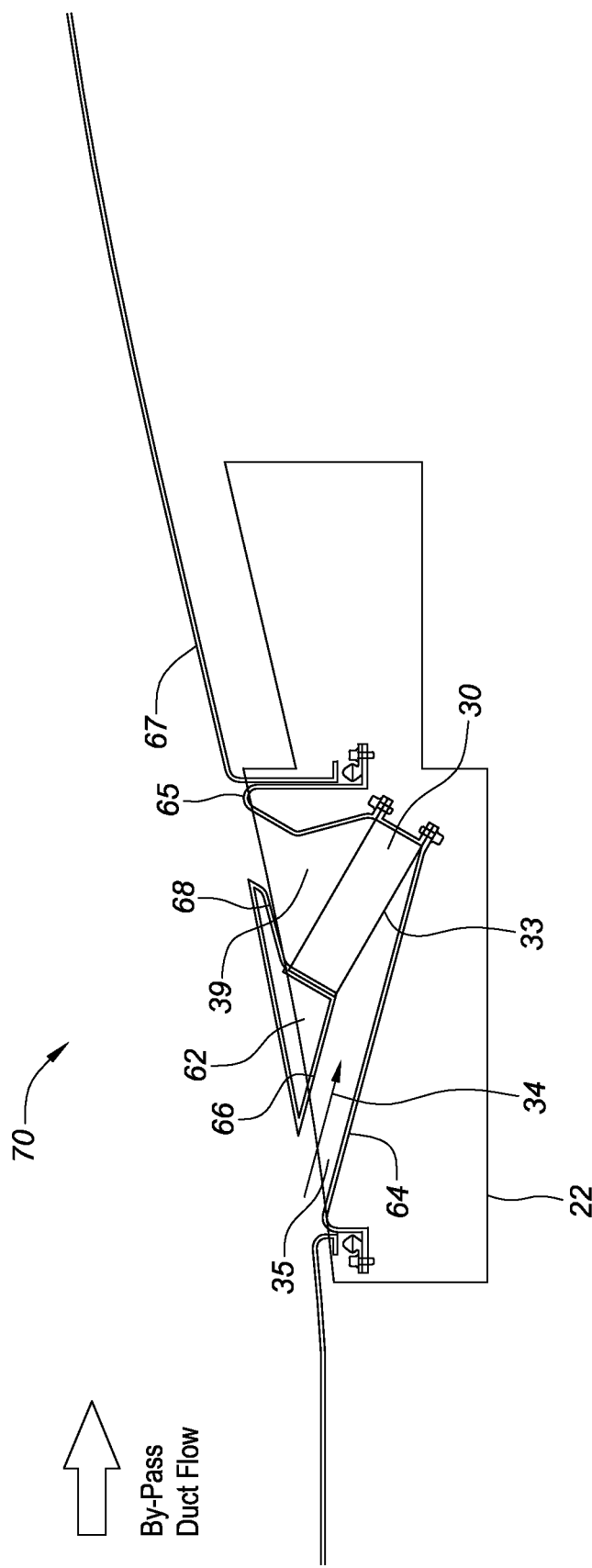
FIG. 13 illustrates a cross-section view of a flush mounted, forward inclined heat exchanger assembly.

FIG. 13 illustrates a cross-section view of a flush mounted, forward inclined heat exchanger assembly 70. The assembly 70 shown in FIG. 13 is very similar to the assembly 60 shown in FIG. 12 except the fairing 62 is flush mounted instead of semi-protruding and the heat exchanger resides below the aerodynamic surface of the inner fan duct. This may be accomplished in a number of ways but in the embodiment in FIG. 13, and generally, it is accomplished by modifying the inlet duct lower wall 64 and the outlet duct lower wall 65 to push the heat exchange farther below the bypass duct wall.

In the embodiment in FIG. 13, the elongated portion of the inlet duct lower wall 64 is lengthened and the outlet duct lower wall 65 has been redesigned to push the heat exchanger and fairing down such that a flush mount with the bypass duct surface 67 is achieved. In a flush mount, the assembly is positioned such that the top surface of the heat exchanger 30 is below the bypass duct aerodynamic surface or close thereto.

In the embodiment of FIG. 13, the outlet duct lower wall 65 has been redesigned. The outlet duct lower wall of FIG. 13 comprises two elongated portions that form an elbow at an obtuse angle. On one end of the elongated portion is a functional interface that couples the outlet duct lower wall 65 to the heat exchanger 30. On the opposite end of the outlet duct lower wall 65 is another functional interface to interface with the bypass duct. In both the semi-protruding and flush mount configurations, the inlet duct lower wall 64 and outlet duct lower wall 65 are always flush/submerged relative to the bypass duct inner wall.

Figure 14:
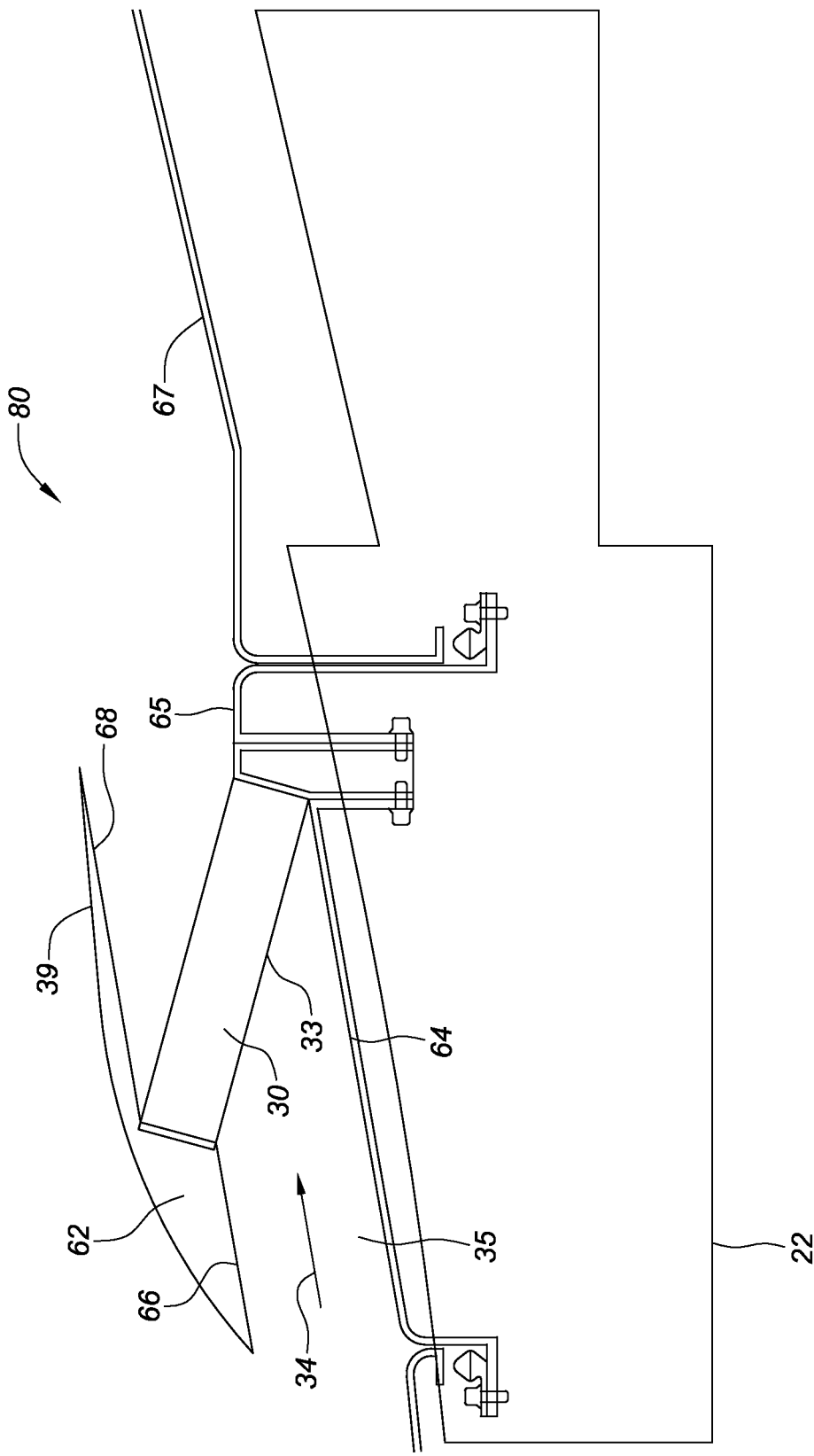
FIG. 14 illustrates a cross-section view of a fully protruding, forward inclined heat exchanger assembly.

FIG. 14 illustrates a cross-section view of a fully protruding, forward inclined heat exchanger assembly 70. The design of the heat exchanger assembly 80 in FIG. 14 is similar to the assembly 60 in FIG. 12 except the heat exchanger 30 is fully protruding into the bypass duct. By fully extended it is intended that between 90% and 100% of the heat exchanger is located above the bypass duct aerodynamic surface 67. In a preferred embodiment, the entire (100%) of the heat exchanger is located above the bypass duct aerodynamic surface 67. In the embodiment shown in FIG. 14, this is achieved by modifying the bottom inlet duct 64 and bottom outlet duct 65. In addition, the fairing 62 may or may not be modified.

In the embodiment in FIG. 14, the inlet duct lower wall 64 is of a similar design to the inlet duct lower wall of the heat exchangers in FIGS. 12 and 13. However, in FIG. 14, the inlet duct lower wall 64 is designed and positioned to maintain the bottom of the heat exchanger in line with the bypass duct bottom surface 67. In some embodiments, no separate inlet duct lower wall 64 is needed and the inlet duct lower wall 64 may be formed by the original bypass duct surface.

As may be seen in FIG. 14, in some embodiments, the top surface of the fairing 62 may be curved. In the embodiment of FIG. 14, the top surface of the fairing 62 is curved all the way from the front to the back. In yet other embodiments, only a portion of the top surface of the fairing 62 is curved and other portions are straight.

Figure 15:
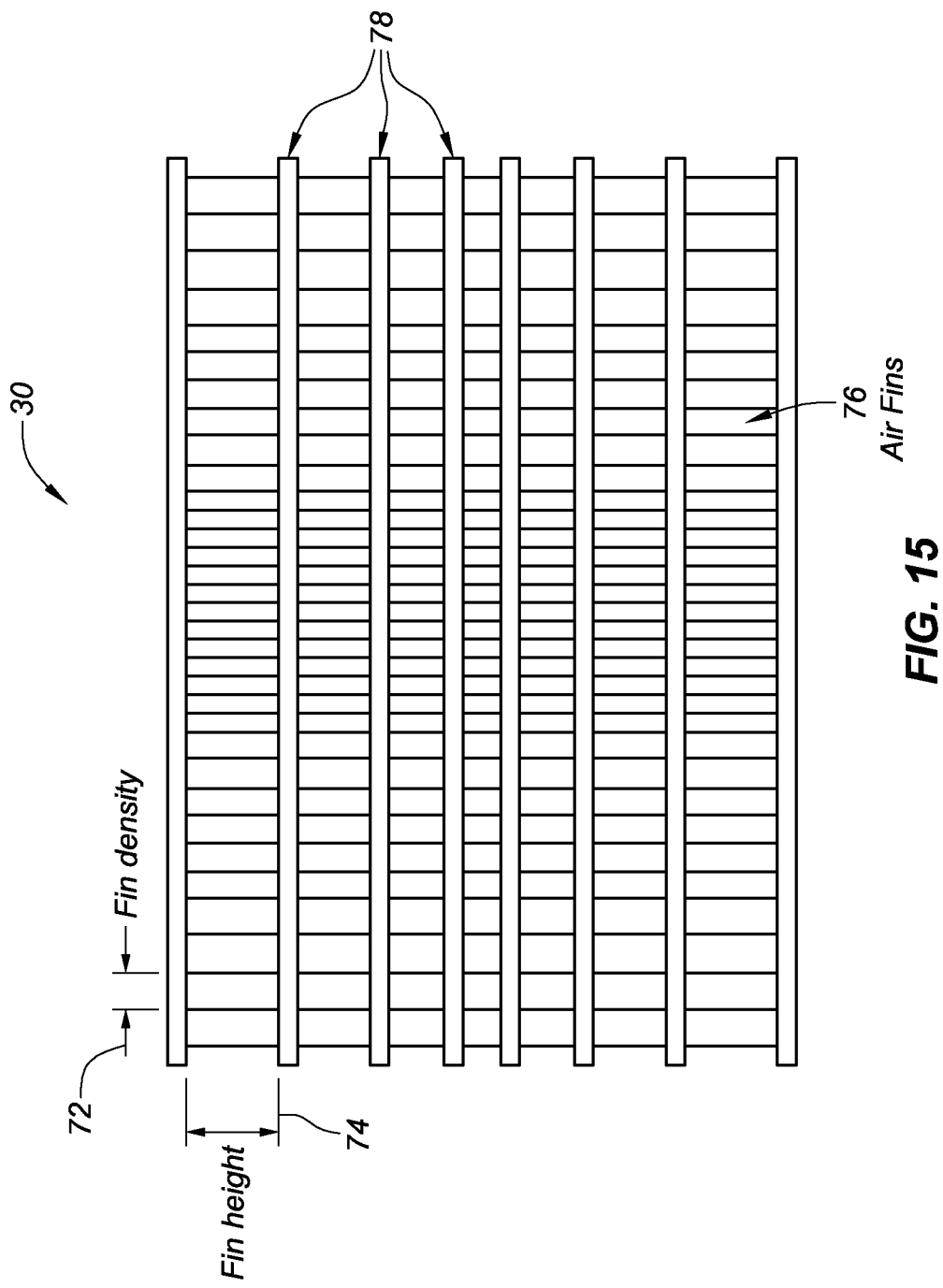
FIG. 15 illustrates a view of a custom fin arrangement in a heat exchanger.

In addition to the design of the heat exchanger assemblies, the heat exchangers themselves may be designed to increase the benefits of the assemblies taught herein. FIG. 15 illustrates a view of a custom fin arrangement in a heat exchanger 30. In particular, the fin height 74 and fin density 72 inside the heat exchanger 30 may be modified to increase the performance of the assembly. The fin height 74 and the fin density 72 may be varied across the air side 76 of the heat exchanger to maximize the thermal energy transfer in the heat exchanger and/or accommodate varying air flow velocities at the heat exchanger inlet face. The fin density 72 and fin height 74 could be varied within the fluid channels 78 to accommodate mal-distribution in the inlet header and to account for variation in fluid properties through the heat exchanger 30.

As one may appreciate from FIG. 15, varying the fin height 74 is equivalent to, or is accomplished by, varying the fluid channel spacing 78. To this end, the fin height 74 may be thought of as the space between the fluid channels 78.

As may be seen in FIG. 15, the fin height 74 of the air fins 76 is not constant. The fluid channels 78 are spaced farther apart near the top and bottom of the heat exchanger than they are in the middle. In the heat exchanger shown in FIG. 15, the fin height 74 gets symmetrically larger as you move away from the middle of the heat exchanger in either direction. However, in other embodiments, other fin height 74 configurations may be used. For example, the fin height 74 may steadily increase from top to bottom or bottom to top. In yet other embodiments, the fin height 74 may be narrow in one portion of the heat exchanger and wider in others and such areas may be spaced intermittently.

In addition to varying fin heights 74, the fin density 72 may also be varied. As may be seen in FIG. 15, the fin density 72 is the spacing of the fins one next to the other between the fluid channels 78. In the embodiment shown in FIG. 15, the fin density 72 steadily decreases symmetrically as you move away from the middle of the heat exchanger 30 toward either side. However, in other embodiments, other configurations of fin density 72 may be used. For example, the fin density 72 may increase from left to right or right to left. In yet other embodiments, the fin density 72 may be intermittent through each channel such that fin densities 72 between some channels are more than between other channels. In yet other examples, fin densities 72 are correlated to fin heights 74 such that areas with a larger fin height have a larger fin density. In such embodiments, the fin heights 74 and fin densities 72 may be proportional. In yet other embodiments, the fin densities 72 may be inversely proportional to the fin heights 74. In yet other embodiments, pockets of increased fin densities 72 may exist throughout the heat exchanger 30.

Figure 16:
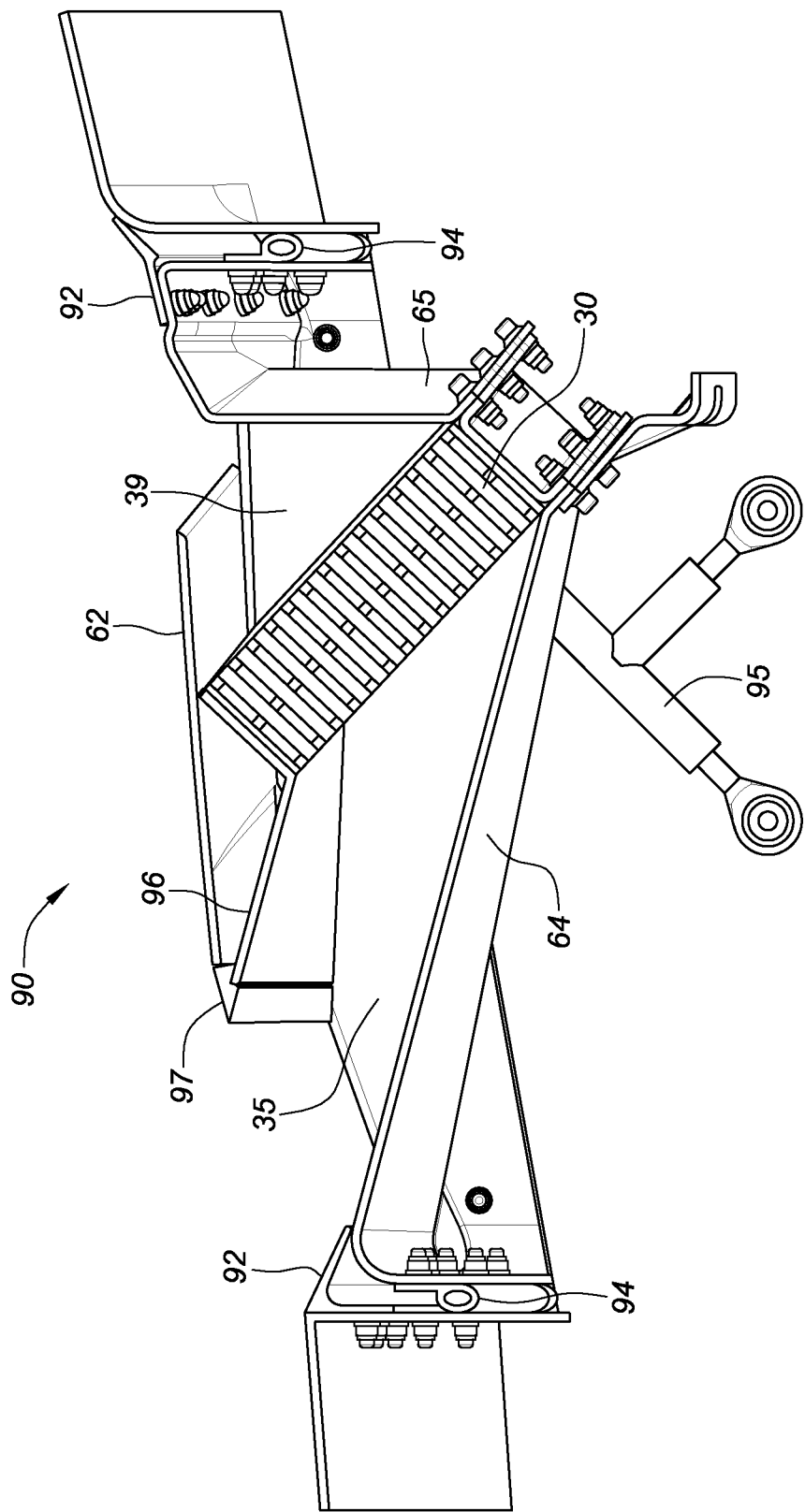
FIG. 16 illustrates a three-dimensional cross-section of a heat exchanger assembly.

FIG. 16 illustrates a three-dimensional cross-section of a heat exchanger assembly 90. The heat exchanger assembly 90 is illustrated in FIG. 16 with the additional attachments and pieces to fully integrate the heat exchanger assembly 90 with the bypass duct. As may be seen in FIG. 16, at each side of the heat exchanger assembly 90 an aerodynamic seal 92 and a fire/pressure seal 94 are used to seal the heat exchanger assembly 90 to the bypass duct.

In the embodiment shown in FIG. 16, the heat exchanger assembly 90 is supported by the engine casing via struts, brackets, shocks 95 or any other type of connection. In other embodiments, the various components of the heat exchanger assembly 90 may be supported in other ways. In the embodiment of FIG. 16, the inlet duct lower wall 64 and outlet duct lower wall 65 interface with the bypass duct via seals 92 and 94 only. In this embodiment, the inlet duct lower wall 64 and outlet duct lower wall 65 are supported via the heat exchanger 30, which is supported by the engine casing via struts 95. However, in other embodiments, support for the inlet duct lower wall 64 and outlet duct lower wall 65 may be different. For example, in one embodiment, in addition to being supported by the heat exchanger 30, the inlet duct lower wall 64 and outlet duct lower wall 65 may be coupled to the bypass duct. In such embodiment, fasteners, epoxy, crimping or any other method of coupling may be used to couple the inlet duct lower wall 64 and outlet duct lower wall 65 to the bypass duct. In yet other embodiments, the inlet duct lower wall 64 and outlet duct lower wall 65 may be supported in other ways including but not limited to being coupled to the bypass duct only.

In operation, the bypass duct (inner fan duct) and engine casing may have relative movement to each other due to: thermal expansion, vibration, or low relative stiffness of the inner fan duct. Consequently, relative motion can occur between the heat exchanger assembly 90 and the bypass duct. This relative motion may occur particularly in embodiments where the inlet duct lower wall 64 and outlet duct lower wall only interface with the bypass duct and are not coupled to the bypass duct. The inner fan duct acts as a fire wall, so the sealing solution has to function as both a fire stop and pressure (air) seal. The seal also needs to act as an aerodynamic aid between any joints within the assembly.

Figure 17:
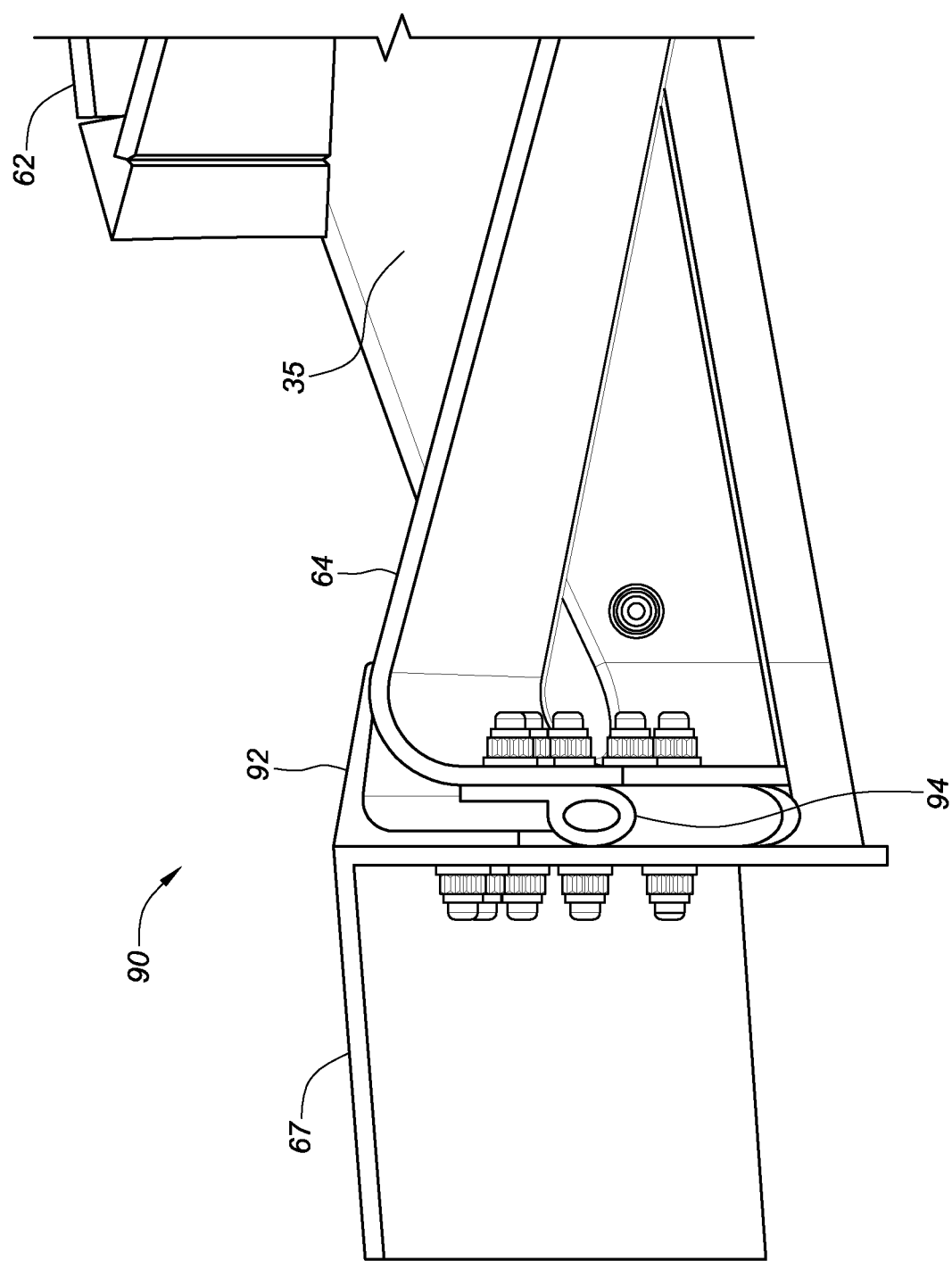
FIG. 17 illustrates a closeup three-dimensional cross-section of the interface between the lower input duct and the bypass duct of the heat exchanger assembly of FIG. 16.

FIG. 17 illustrates a closeup three-dimensional cross-section of the interface between the lower input duct 64 and the bypass duct 67 of the heat exchanger assembly 90 of FIG. 16. As may be seen, in the embodiment of FIGS. 16 and 17, the aerodynamic seals 92 and fire/pressure seals 94 are split into two separate components. The aero dynamic seal is a V shaped seal where one leg of the V is used to couple the seal to the bypass duct 67 and the other leg of the V rests over the gap between the bypass duct 67 and the inlet duct lower wall 64. The aerodynamic seal 92 covers the gap between the bypass duct 67 and the inlet duct lower wall 64. The aerodynamic seal always provides a smooth transition between the components throughout the range of relative motion.

As may be appreciated, a majority of the relative motion between the heat exchanger assembly 90 and the bypass duct 67 is in the vertical direction. The relative movement may be relatively large; as much as ~25 mm [1 inch]. In traditional installations, the fire pressure seal has to accommodate this movement within its compression. However, in the design in FIGS. 16 and 17, the fire/pressure seal sealing face has been rotated 90° to the vertical axis. Accordingly, the fire pressure seal 94 no longer has to accommodate the vertical relative motion within its compression, enabling a smaller seal to be used.

As may be seen in FIG. 17, the fire seal 94 is a "P" shaped seal. Both the bypass duct 67 and the inlet duct lower wall 64 have walls/flanges/tabs that transition to extend vertically. The "P" shaped fire seal 94 is compressed between the vertical walls/flanges/tabs of the bypass duct 67 and the inlet duct lower wall 67. Returning to FIG. 16, it may be appreciated that the same set up is used between the outlet duct lower wall 39 and the bypass duct. In other embodiments, differing seal geometries to a "P" shaped seal could be utilized within this general arrangement.

The fairing 62 may have a number of different constructions. In the embodiment shown in FIG. 16, the fairing has a three-piece construction and comprises, a wall integrated into the heat exchanger 96, a metallic leading edge 97, and the top fairing 62. Separating the fairing into a plurality of pieces allows them to be made of different materials and allows a more selective choice of material for the metallic leading edge while using lighter materials for other portions such as the top of the fairing.

Figure 18:
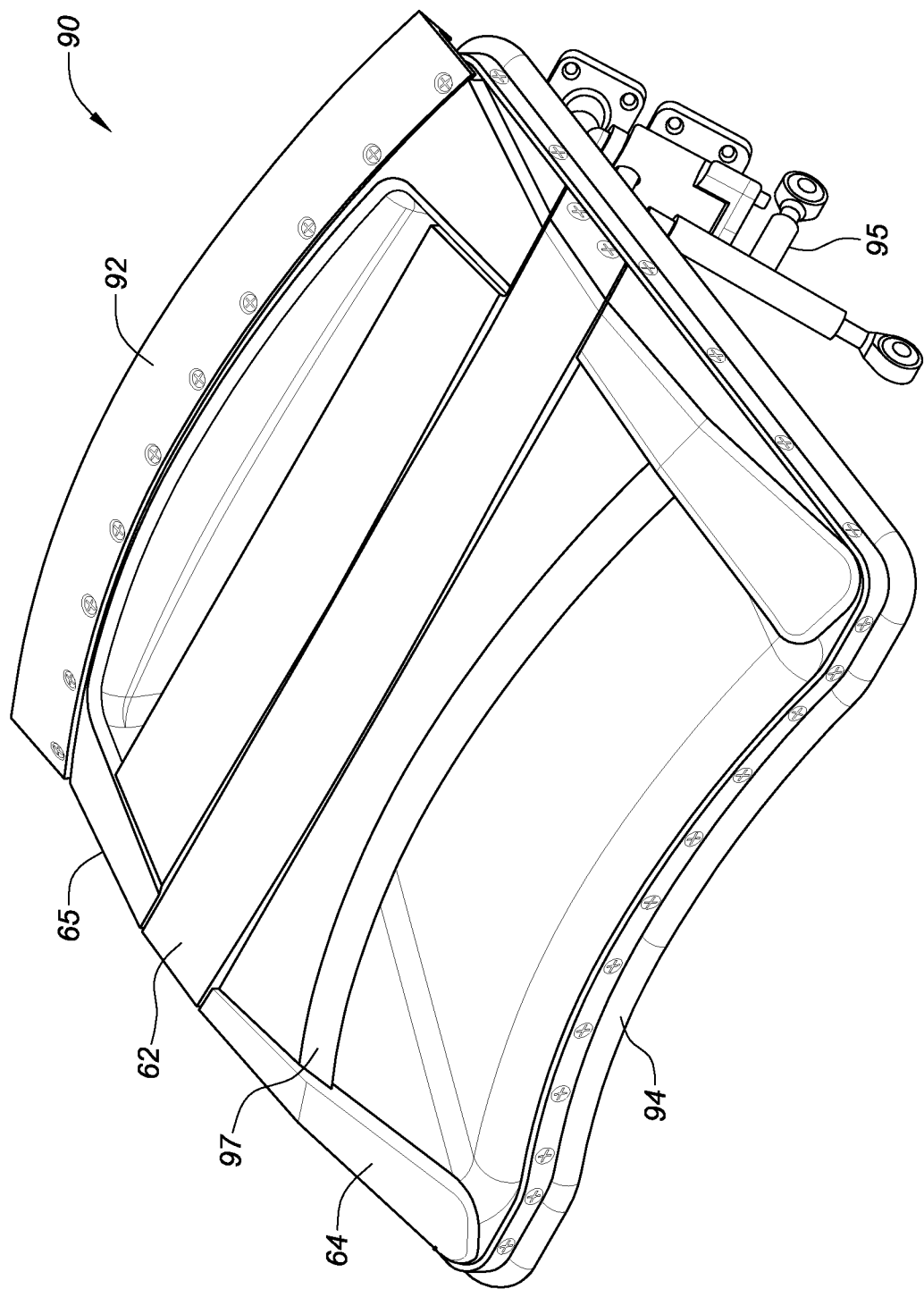
FIG. 18 illustrates a three-dimensional isometric view of a heat exchanger assembly like the one shown in FIG. 16.

FIG. 18 illustrates a three-dimensional isometric view of a heat exchanger assembly 90 like the one shown in FIG. 16. As may be appreciated, the fire seal 94 may actually be one continuous "P" shaped gasket that surrounds the entire assembly. In other embodiments, the fire seal may be comprised of a plurality of smaller pieces.

Figure 19:
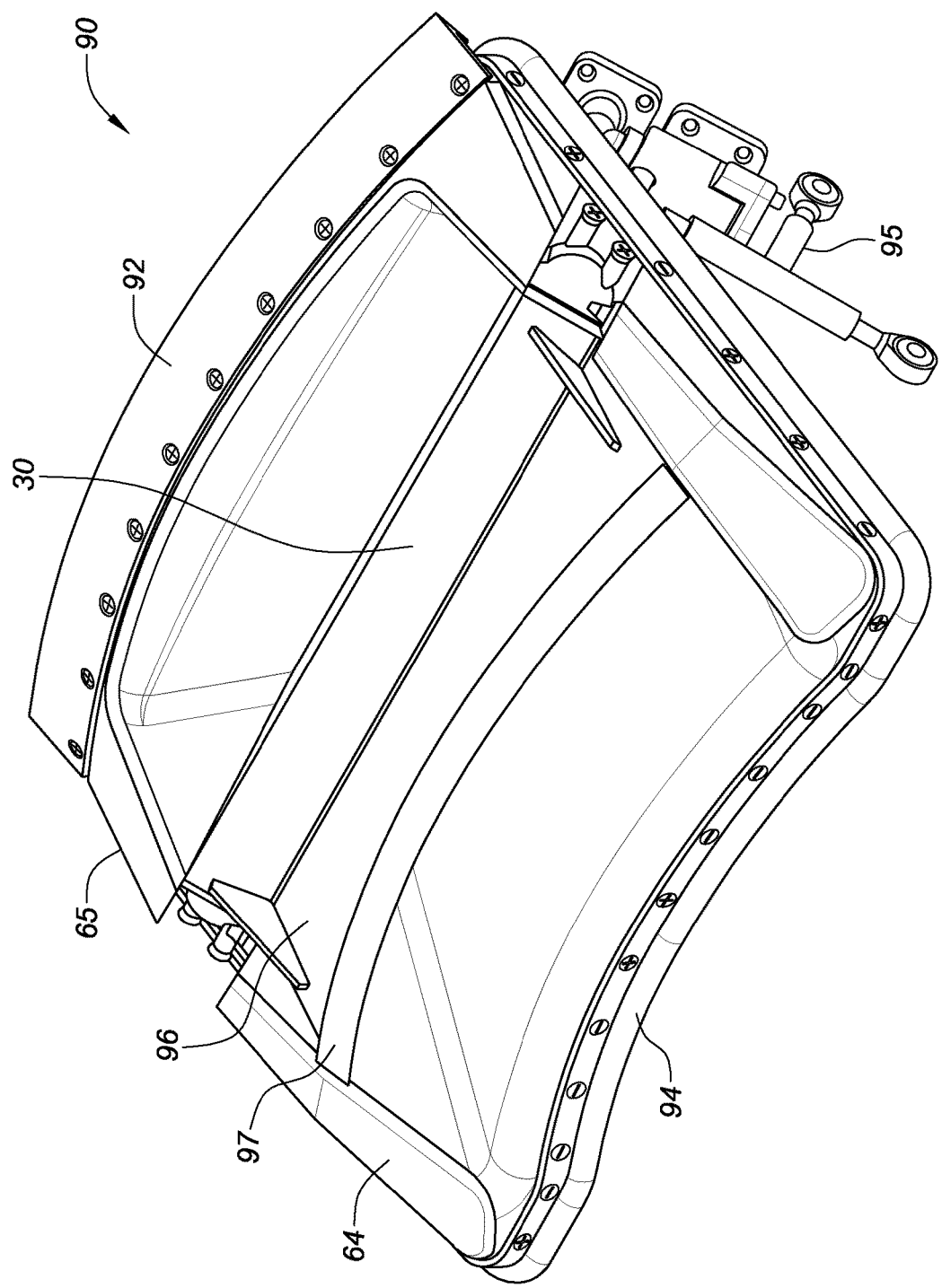
FIG. 19 illustrates a three-dimensional isometric view of the heat exchanger assembly of FIG. 18 without the fairing.

FIG. 19 illustrates a three-dimensional isometric view of the heat exchanger assembly 90 of FIG. 18 without the fairing 62. As may be appreciated, the fire seal 94 may actually be one continuous "P" shaped gasket that surrounds the entire assembly. In other embodiments, the fire seal may be comprised of a plurality of smaller pieces.

In some embodiments, the heat exchanger may be fully integrated with the bypass duct inner wall with the inlet duct lower wall 64 and outlet duct lower wall 65 are formed by the bypass duct inner wall surface. Returning to FIG. 16, one can see that in the embodiment shown therein, the lower walls of the inlet duct 64 and outlet duct 65 are separate components to the fairing 62 and/or 96 and 97. In various different embodiments, the inlet duct lower wall 64 and outlet duct lower wall 65 may be separate components or made from one single component. If the inlet and outlet lower wall 64 and 65 are manufactured as one piece, or they are formed by the by pass duct inner wall, then the heat exchanger 30 is considered located entirely outside the engine core zone. Accordingly, the heat exchanger 30 is not exposed to the extreme environment found within the core zone. Consequently, the heat exchanger 30 would also not be exposed to the fire requirements of the engine zone.

As discussed above, the fairing may be comprised of a number of different pieces that combine to form the fairing. In the embodiment shown in FIG. 16, the fairing 62 is formed by an extension 96 of the inclined/compound angle heat exchanger 30 in an aerodynamic form. The extension 96 may be ruggedized with a metallic leading edge 97. The outer surface 62 is a low temperature capability, low cost material as it has no impact, duty or thermal loads. In various other embodiments, the entirety of the fairing, including the leading edge 97 and inlet duct upper wall 96, are separate component(s) from the heat exchanger 30.

The embodiments described herein are exemplary and are not meant to limit the scope of the claims as claimed below. As one skilled in the art will appreciate, many modifications and substitutions to the embodiments disclosed herein are possible without departing from the spirit of the embodiments disclosed.

What is claimed is:
1. A heat exchanger assembly comprising:
an inlet duct lower wall interfacing with a bypass duct;
an outlet duct lower wall interfacing with the bypass duct;
a heat exchanger coupled between the inlet duct lower wall and the outlet duct lower wall wherein an intake plane of the heat exchanger is not normal to an inlet duct air flow direction at the intake plane; and
a fairing coupled to the top of the heat exchanger wherein the fairing forms an inlet duct upper wall, an outlet duct upper wall and a bottom that spans between the inlet duct upper wall and outlet duct upper wall and wherein a first angle is formed between the inlet duct upper wall and the bottom and a second angle is formed between the outlet duct upper wall and the bottom and one of either the first angle and second angle is less than 180 degrees and one of either the first angle and second angle is more than 180 degrees.

2. The heat exchanger assembly of claim 1, wherein the heat exchanger is angled forward or backward with respect to a normal to the inlet duct air flow direction at the intake plane and the heat exchanger is angled in at least one additional plane.

3. The heat exchanger assembly of claim 1, wherein the inlet duct lower wall and the inlet duct upper wall remain parallel throughout their lengths.

4. The heat exchanger assembly of claim 1, wherein the inlet duct lower wall and the inlet duct upper wall form an inlet duct and a cross-section of the inlet duct perpendicular to the inlet duct air flow direction maintains a constant area.

5. The heat exchanger assembly of claim 1, wherein the assembly is mounted to an engine casing.

6. The heat exchanger assembly of claim 1, wherein the heat exchanger is swept to follow an engine casing contour.

7. The heat exchanger assembly of claim 6, wherein the inlet duct lower wall, the outlet duct lower wall and the fairing are all swept to follow the engine casing contour.

8. The heat exchanger assembly of claim 1, wherein the heat exchanger assembly is semi-protruding into a bypass duct flow.

9. The heat exchanger assembly of claim 1, wherein fin height or fin density are varied to match an air flow profile of an inlet duct formed by the inlet duct lower wall and inlet duct upper wall.

10. The heat exchanger assembly of claim 1, wherein the inlet duct lower wall and the outlet duct lower wall are sealed to the bypass duct at about a 90 degree angle to a direction of a maximum relative motion between the heat exchanger assembly and an engine casing.

11. The heat exchanger assembly of claim 10, wherein a "P" seal is used to seal the inlet duct lower wall and outlet duct lower wall to the bypass duct.

12. The heat exchanger assembly of claim 1, wherein the inlet duct lower wall and outlet duct lower wall are formed as a single piece.

13. The heat exchanger assembly of claim 1, wherein the fairing is mounted directly to the top of the heat exchanger.

14. A heat exchanger assembly comprising:
an inlet duct;
an outlet duct;
a heat exchanger coupled between the inlet duct and outlet duct wherein an Intake plane of the heat exchanger is not normal to an inlet duct air flow direction at the intake plane; and
a fairing coupled to the top of the heat exchanger wherein the fairing forms an inlet duct upper wall, an outlet duct upper wall, and a bottom that spans between the inlet duct upper wall and outlet duct upper wall and wherein a first angle is formed between the inlet duct upper wall and the bottom and a second angle is formed between the outlet duct upper wall and the bottom and one of either the first angle and second angle is less than 180 degrees and one of either the first angle and second angle is more than 180 degrees.

15. The heat exchanger assembly of claim 14, wherein the heat exchanger is angled forward or backward with respect to a normal to the inlet duct air flow direction at the intake plane and the heat exchanger is angled in at least one additional plane.

16. The heat exchanger assembly of claim 14, wherein a cross-section of the inlet duct perpendicular to the inlet duct air flow direction maintains a constant area.

17. The heat exchanger assembly of claim 14, wherein the heat exchanger is swept to follow an engine casing contour.

18. The heat exchanger assembly of claim 17, wherein the inlet duct and outlet duct are swept to follow the engine casing contour.

19. The heat exchanger assembly of claim 14, wherein the heat exchanger assembly is semi-protruding into a bypass duct flow.

20. The heat exchanger assembly of claim 12, wherein a lower wall of the inlet duct and a lower wall of an outlet duct are sealed to a bypass duct at about a 90 degree angle to a direction of a maximum relative motion between the heat exchanger assembly and an engine casing.

21. The heat exchanger assembly of claim 14, wherein an inlet duct lower wall and an outlet duct lower wall are formed as a single piece.

22. The heat exchanger assembly of claim 14, wherein the fairing is mounted directly to the top of the heat exchanger.

23. A heat exchanger assembly comprising:
an inlet duct;
an outlet duct;
a heat exchanger coupled between the inlet duct and outlet duct wherein an intake plane of the heat exchanger is not normal to an inlet duct air flow direction at the intake plane; and
a fairing coupled to the top of the heat exchanger wherein the fairing forms an inlet duct upper wall, an outlet duct upper wall, and a bottom that spans between the inlet duct upper wall and outlet duct upper wall and wherein a first angle is formed between the inlet duct upper wall and the bottom and a second angle is formed between the outlet duct upper wall and the bottom and one of either the first angle and second angle is less than 180 degrees and one of either the first angle and second angle is more than 180 degrees.

24. The heat exchanger assembly of claim 23, wherein the heat exchanger is angled forward or backward with respect to a normal to an inlet duct air flow direction at the intake plane and the heat exchanger is angled in at least one additional plane.

25. The heat exchanger of claim 23, wherein the outlet duct is a convergent duct.

26. The heat exchanger assembly of claim 23, wherein an inlet duct lower wall and the inlet duct upper wall form the inlet duct and a cross-section of the inlet duct perpendicular to an inlet duct air flow direction maintains a constant area.

27. The heat exchanger assembly of claim 23, wherein the heat exchanger is contoured to follow underlying surfaces of a structure.

28. The heat exchanger assembly of claim 27, wherein an inlet duct lower wall, an outlet duct lower wall and the fairing are all contoured to follow the underlying surfaces of the structure.

29. The heat exchanger assembly of claim 23, wherein the heat exchanger is semi-protruding into an airflow stream.

30. The heat exchanger assembly of claim 23, wherein fin height or fin density are varied to match an air flow profile of the inlet duct.

31. The heat exchanger assembly of claim 23, wherein an inlet duct lower wall and an outlet duct lower wall are sealed to a primary structure at about a 90 degree angle to a direction of a maximum relative motion between the heat exchanger assembly and the primary structure.

32. The heat exchanger assembly of claim 23, wherein an inlet duct lower wall and an outlet duct lower wall are formed as a single piece.

33. The heat exchanger assembly of claim 23, wherein the fairing is mounted directly to the top of the heat exchanger.

* * * * *